(12) United States Patent
George et al.

(10) Patent No.: US 9,703,816 B2
(45) Date of Patent: Jul. 11, 2017

(54) METHOD AND SYSTEM FOR FORWARD REFERENCE LOGGING IN A PERSISTENT DATASTORE

(71) Applicant: SanDisk Enterprise IP LLC, Milpitas, CA (US)

(72) Inventors: Johann George, Sunnyvale, CA (US); Aaron Olbrich, Morgan Hill, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 50 days.

(21) Appl. No.: 14/135,400

(22) Filed: Dec. 19, 2013

(65) Prior Publication Data

US 2015/0142860 A1    May 21, 2015

Related U.S. Application Data

(60) Provisional application No. 61/906,406, filed on Nov. 19, 2013.

(51) Int. Cl.
G06F 17/30 (2006.01)
G06F 7/00 (2006.01)
(Continued)

(52) U.S. Cl.
CPC ........ G06F 17/30312 (2013.01); G06F 3/064 (2013.01); G06F 3/0611 (2013.01); G06F 3/0619 (2013.01); G06F 3/0643 (2013.01); G06F 3/0679 (2013.01); G06F 3/0688 (2013.01); G06F 11/14 (2013.01); G06F 17/30 (2013.01); G06F 17/30289 (2013.01);
(Continued)

(58) Field of Classification Search
CPC ........ G06F 17/30067; G06F 17/30607; G06F 3/0605; G06F 3/0683; G06F 3/0601
USPC ........................................................ 707/812
See application file for complete search history.

(56) References Cited

U.S. PATENT DOCUMENTS 4,173,737 A    11/1979   Skerlos et al.
4,888,750 A    12/1989   Kryder et al.
(Continued)

FOREIGN PATENT DOCUMENTS

EP    1 299 800      4/2003
EP    1465203 A1    10/2004
(Continued)

OTHER PUBLICATIONS

Barr, Introduction to Watchdog Timers, Oct. 2001, 3 pgs.
(Continued)

*Primary Examiner* — Usmaan Saeed
*Assistant Examiner* — Raquel Perez-Arroyo
(74) *Attorney, Agent, or Firm* — Morgan, Lewis & Bockius LLP

(57) ABSTRACT

The embodiments described herein are methods and systems to enhance the reliability and performance of a persistent datastore (e.g., non-volatile memory such as flash memory). The method includes generating a log entry associated with first write data. The method also includes generating a first record including the log entry, the first write data, and pointer to a second record different from the first record. The method further includes performing a single write operation that includes writing the first record to the persistent datastore.

19 Claims, 11 Drawing Sheets

(51) Int. Cl.
  *G06F 3/06* (2006.01)
  *G06F 11/14* (2006.01)
  *G06F 12/02* (2006.01)
(52) U.S. Cl.
  CPC .. *G06F 17/30368* (2013.01); *G06F 17/30371* (2013.01); *G06F 12/0246* (2013.01)

(56) References Cited

U.S. PATENT DOCUMENTS

| | | |
|---|---|---|
| 4,916,652 A | 4/1990 | Schwarz et al. |
| 5,129,089 A | 7/1992 | Nielsen |
| 5,270,979 A | 12/1993 | Harari et al. |
| 5,329,491 A | 7/1994 | Brown et al. |
| 5,381,528 A | 1/1995 | Brunelle |
| 5,404,485 A | 4/1995 | Ban |
| 5,488,702 A | 1/1996 | Byers et al. |
| 5,519,847 A | 5/1996 | Fandrich et al. |
| 5,530,705 A | 6/1996 | Malone, Sr. |
| 5,537,555 A | 7/1996 | Landry et al. |
| 5,551,003 A | 8/1996 | Mattson et al. |
| 5,636,342 A | 6/1997 | Jeffries |
| 5,657,332 A | 8/1997 | Auclair et al. |
| 5,666,114 A | 9/1997 | Brodie et al. |
| 5,708,849 A | 1/1998 | Coke et al. |
| 5,765,185 A | 6/1998 | Lambrache et al. |
| 5,890,193 A | 3/1999 | Chevallier |
| 5,930,188 A | 7/1999 | Roohparvar |
| 5,936,884 A | 8/1999 | Hasbun et al. |
| 5,943,692 A | 8/1999 | Marberg et al. |
| 5,946,714 A | 8/1999 | Miyauchi |
| 5,982,664 A | 11/1999 | Watanabe |
| 6,000,006 A | 12/1999 | Bruce et al. |
| 6,006,345 A | 12/1999 | Berry, Jr. |
| 6,016,560 A | 1/2000 | Wada et al. |
| 6,018,304 A | 1/2000 | Bessios |
| 6,044,472 A | 3/2000 | Crohas |
| 6,070,074 A | 5/2000 | Perahia et al. |
| 6,104,304 A | 8/2000 | Clark et al. |
| 6,119,250 A | 9/2000 | Nishimura et al. |
| 6,138,261 A | 10/2000 | Wilcoxson et al. |
| 6,182,264 B1 | 1/2001 | Ott |
| 6,192,092 B1 | 2/2001 | Dizon et al. |
| 6,260,120 B1 | 7/2001 | Blumenau et al. |
| 6,295,592 B1 | 9/2001 | Jeddeloh |
| 6,311,263 B1 | 10/2001 | Barlow et al. |
| 6,408,394 B1 | 6/2002 | Vander Kamp et al. |
| 6,412,042 B1 | 6/2002 | Paterson et al. |
| 6,442,076 B1 | 8/2002 | Roohparvar |
| 6,449,625 B1 | 9/2002 | Wang |
| 6,484,224 B1 | 11/2002 | Robins et al. |
| 6,516,437 B1 | 2/2003 | Van Stralen et al. |
| 6,564,285 B1 | 5/2003 | Mills et al. |
| 6,647,387 B1 | 11/2003 | McKean et al. |
| 6,678,788 B1 | 1/2004 | O'Connell |
| 6,728,879 B1 * | 4/2004 | Atkinson ............ G06Q 30/06 707/999.202 |
| 6,757,768 B1 | 6/2004 | Potter et al. |
| 6,775,792 B2 | 8/2004 | Ulrich et al. |
| 6,810,440 B2 | 10/2004 | Micalizzi, Jr. et al. |
| 6,836,808 B2 | 12/2004 | Bunce et al. |
| 6,836,815 B1 | 12/2004 | Purcell et al. |
| 6,842,436 B2 | 1/2005 | Moeller |
| 6,865,650 B1 | 3/2005 | Morley et al. |
| 6,871,257 B2 | 3/2005 | Conley et al. |
| 6,895,464 B2 | 5/2005 | Chow et al. |
| 6,934,755 B1 | 8/2005 | Saulpaugh et al. |
| 6,966,006 B2 | 11/2005 | Pacheco et al. |
| 6,978,343 B1 | 12/2005 | Ichiriu |
| 6,980,985 B1 | 12/2005 | Amer-Yahia et al. |
| 6,981,205 B2 | 12/2005 | Fukushima et al. |
| 6,988,171 B2 | 1/2006 | Beardsley et al. |
| 7,020,017 B2 | 3/2006 | Chen et al. |
| 7,024,514 B2 | 4/2006 | Mukaida et al. |
| 7,028,165 B2 | 4/2006 | Roth et al. |
| 7,032,123 B2 | 4/2006 | Kane et al. |
| 7,043,505 B1 | 5/2006 | Teague et al. |
| 7,076,598 B2 | 7/2006 | Wang |
| 7,100,002 B2 | 8/2006 | Shrader |
| 7,102,860 B2 | 9/2006 | Wenzel |
| 7,111,293 B1 | 9/2006 | Hersh et al. |
| 7,126,873 B2 | 10/2006 | See et al. |
| 7,133,282 B2 | 11/2006 | Sone |
| 7,155,579 B1 | 12/2006 | Neils et al. |
| 7,162,678 B2 | 1/2007 | Saliba |
| 7,173,852 B2 | 2/2007 | Gorobets et al. |
| 7,184,446 B2 | 2/2007 | Rashid et al. |
| 7,212,440 B2 | 5/2007 | Gorobets |
| 7,269,755 B2 | 9/2007 | Moshayedi et al. |
| 7,275,170 B2 | 9/2007 | Suzuki |
| 7,295,479 B2 | 11/2007 | Yoon et al. |
| 7,328,377 B1 | 2/2008 | Lewis et al. |
| 7,426,633 B2 | 9/2008 | Thompson et al. |
| 7,486,561 B2 | 2/2009 | Mokhlesi |
| 7,516,292 B2 | 4/2009 | Kimura et al. |
| 7,523,157 B2 | 4/2009 | Aguilar, Jr. et al. |
| 7,527,466 B2 | 5/2009 | Simmons |
| 7,529,466 B2 | 5/2009 | Takahashi |
| 7,533,214 B2 | 5/2009 | Aasheim et al. |
| 7,546,478 B2 | 6/2009 | Kubo et al. |
| 7,566,987 B2 | 7/2009 | Black et al. |
| 7,571,277 B2 | 8/2009 | Mizushima |
| 7,574,554 B2 | 8/2009 | Tanaka et al. |
| 7,596,643 B2 | 9/2009 | Merry, Jr. et al. |
| 7,669,003 B2 | 2/2010 | Sinclair et al. |
| 7,681,106 B2 | 3/2010 | Jarrar et al. |
| 7,685,494 B1 | 3/2010 | Varnica et al. |
| 7,707,481 B2 | 4/2010 | Kirschner et al. |
| 7,761,655 B2 | 7/2010 | Mizushima et al. |
| 7,765,454 B2 | 7/2010 | Passint |
| 7,774,390 B2 | 8/2010 | Shin |
| 7,809,836 B2 | 10/2010 | Mihm et al. |
| 7,840,762 B2 | 11/2010 | Oh et al. |
| 7,870,326 B2 | 1/2011 | Shin et al. |
| 7,890,818 B2 | 2/2011 | Kong et al. |
| 7,913,022 B1 | 3/2011 | Baxter |
| 7,925,960 B2 | 4/2011 | Ho et al. |
| 7,934,052 B2 | 4/2011 | Prins et al. |
| 7,945,825 B2 | 5/2011 | Cohen et al. |
| 7,954,041 B2 | 5/2011 | Hong et al. |
| 7,971,112 B2 | 6/2011 | Murata |
| 7,974,368 B2 | 7/2011 | Shieh et al. |
| 7,978,516 B2 | 7/2011 | Olbrich et al. |
| 7,996,642 B1 | 8/2011 | Smith |
| 8,006,161 B2 | 8/2011 | Lestable et al. |
| 8,032,724 B1 | 10/2011 | Smith |
| 8,041,884 B2 | 10/2011 | Chang |
| 8,042,011 B2 | 10/2011 | Nicolaidis et al. |
| 8,069,390 B2 | 11/2011 | Lin |
| 8,190,967 B2 | 5/2012 | Hong et al. |
| 8,250,380 B2 | 8/2012 | Guyot |
| 8,254,181 B2 | 8/2012 | Hwang et al. |
| 8,259,506 B1 | 9/2012 | Sommer et al. |
| 8,261,020 B2 | 9/2012 | Krishnaprasad et al. |
| 8,312,349 B2 | 11/2012 | Reche et al. |
| 8,385,117 B2 | 2/2013 | Sakurada et al. |
| 8,412,985 B1 | 4/2013 | Bowers et al. |
| 8,429,436 B2 | 4/2013 | Fillingim et al. |
| 8,438,459 B2 | 5/2013 | Cho et al. |
| 8,453,022 B2 | 5/2013 | Katz |
| 8,473,680 B1 | 6/2013 | Pruthi |
| 8,510,499 B1 | 8/2013 | Banerjee |
| 8,531,888 B2 | 9/2013 | Chilappagari et al. |
| 8,554,984 B2 | 10/2013 | Yano et al. |
| 8,627,117 B2 | 1/2014 | Johnston |
| 8,634,248 B1 | 1/2014 | Sprouse et al. |
| 8,694,854 B1 | 4/2014 | Dar et al. |
| 8,700,842 B2 | 4/2014 | Dinker |
| 8,724,789 B2 | 5/2014 | Altberg et al. |
| 8,775,741 B1 | 7/2014 | de la Iglesia |
| 8,788,778 B1 | 7/2014 | Boyle |
| 8,832,384 B1 | 9/2014 | de la Iglesia |
| 8,849,825 B1 | 9/2014 | McHugh et al. |
| 8,874,992 B2 | 10/2014 | Desireddi et al. |
| 8,885,434 B2 | 11/2014 | Kumar |

(56) References Cited

U.S. PATENT DOCUMENTS

| | | |
|---|---|---|
| 8,898,373 B1 | 11/2014 | Kang et al. |
| 8,909,894 B1 | 12/2014 | Singh et al. |
| 8,910,030 B2 | 12/2014 | Goel |
| 8,923,066 B1 | 12/2014 | Subramanian et al. |
| 9,002,805 B1 | 4/2015 | Barber et al. |
| 9,043,517 B1 | 5/2015 | Sprouse et al. |
| 9,052,942 B1 | 6/2015 | Barber et al. |
| 9,063,946 B1 | 6/2015 | Barber et al. |
| 9,128,690 B2 | 9/2015 | Lotzenburger et al. |
| 9,329,789 B1 | 5/2016 | Chu et al. |
| 9,355,060 B1 | 5/2016 | Barber et al. |
| 9,417,917 B1 | 8/2016 | Barber et al. |
| 2001/0026949 A1 | 10/2001 | Ogawa et al. |
| 2001/0050824 A1 | 12/2001 | Buch |
| 2002/0024846 A1 | 2/2002 | Kawahara et al. |
| 2002/0032891 A1 | 3/2002 | Yada et al. |
| 2002/0036515 A1 | 3/2002 | Eldridge et al. |
| 2002/0083299 A1 | 6/2002 | Van Huben et al. |
| 2002/0099904 A1 | 7/2002 | Conley |
| 2002/0116651 A1 | 8/2002 | Beckert et al. |
| 2002/0122334 A1 | 9/2002 | Lee et al. |
| 2002/0152305 A1 | 10/2002 | Jackson et al. |
| 2002/0162075 A1 | 10/2002 | Talagala et al. |
| 2002/0165896 A1 | 11/2002 | Kim |
| 2003/0041299 A1 | 2/2003 | Kanazawa et al. |
| 2003/0043829 A1 | 3/2003 | Rashid et al. |
| 2003/0079172 A1 | 4/2003 | Yamagishi et al. |
| 2003/0088805 A1 | 5/2003 | Majni et al. |
| 2003/0093628 A1 | 5/2003 | Matter et al. |
| 2003/0163594 A1 | 8/2003 | Aasheim et al. |
| 2003/0163629 A1 | 8/2003 | Conley et al. |
| 2003/0188045 A1 | 10/2003 | Jacobson |
| 2003/0189856 A1 | 10/2003 | Cho et al. |
| 2003/0198100 A1 | 10/2003 | Matsushita et al. |
| 2003/0204341 A1 | 10/2003 | Guliani et al. |
| 2003/0212719 A1 | 11/2003 | Yasuda et al. |
| 2003/0225961 A1 | 12/2003 | Chow et al. |
| 2004/0024957 A1 | 2/2004 | Lin et al. |
| 2004/0024963 A1 | 2/2004 | Talagala et al. |
| 2004/0057575 A1 | 3/2004 | Zhang et al. |
| 2004/0062157 A1 | 4/2004 | Kawabe |
| 2004/0073829 A1 | 4/2004 | Olarig |
| 2004/0085849 A1 | 5/2004 | Myoung et al. |
| 2004/0114265 A1 | 6/2004 | Talbert |
| 2004/0143710 A1 | 7/2004 | Walmsley |
| 2004/0148561 A1 | 7/2004 | Shen et al. |
| 2004/0153902 A1 | 8/2004 | Machado et al. |
| 2004/0158775 A1 | 8/2004 | Shibuya et al. |
| 2004/0167898 A1 | 8/2004 | Margolus et al. |
| 2004/0181734 A1 | 9/2004 | Saliba |
| 2004/0199714 A1 | 10/2004 | Estakhri et al. |
| 2004/0210706 A1 | 10/2004 | In et al. |
| 2004/0237018 A1 | 11/2004 | Riley |
| 2005/0060456 A1 | 3/2005 | Shrader et al. |
| 2005/0060501 A1 | 3/2005 | Shrader |
| 2005/0073884 A1 | 4/2005 | Gonzalez et al. |
| 2005/0108588 A1 | 5/2005 | Yuan |
| 2005/0114587 A1 | 5/2005 | Chou et al. |
| 2005/0138442 A1 | 6/2005 | Keller, Jr. et al. |
| 2005/0144358 A1 | 6/2005 | Conley et al. |
| 2005/0144361 A1 | 6/2005 | Gonzalez et al. |
| 2005/0144367 A1 | 6/2005 | Sinclair |
| 2005/0144516 A1 | 6/2005 | Gonzalez et al. |
| 2005/0154825 A1 | 7/2005 | Fair |
| 2005/0172065 A1 | 8/2005 | Keays |
| 2005/0172207 A1 | 8/2005 | Radke et al. |
| 2005/0193161 A1 | 9/2005 | Lee et al. |
| 2005/0201148 A1 | 9/2005 | Chen et al. |
| 2005/0210348 A1 | 9/2005 | Totsuka |
| 2005/0231765 A1 | 10/2005 | So et al. |
| 2005/0249013 A1 | 11/2005 | Janzen et al. |
| 2005/0251617 A1 | 11/2005 | Sinclair et al. |
| 2005/0257120 A1 | 11/2005 | Gorobets et al. |
| 2005/0273560 A1 | 12/2005 | Hulbert et al. |
| 2005/0281088 A1 | 12/2005 | Ishidoshiro et al. |
| 2005/0289314 A1 | 12/2005 | Adusumilli et al. |
| 2006/0010174 A1 | 1/2006 | Nguyen et al. |
| 2006/0039196 A1 | 2/2006 | Gorobets et al. |
| 2006/0039227 A1 | 2/2006 | Lai et al. |
| 2006/0053246 A1 | 3/2006 | Lee |
| 2006/0062054 A1 | 3/2006 | Hamilton et al. |
| 2006/0069932 A1 | 3/2006 | Oshikawa et al. |
| 2006/0085671 A1 | 4/2006 | Majni et al. |
| 2006/0087893 A1 | 4/2006 | Nishihara et al. |
| 2006/0103480 A1 | 5/2006 | Moon et al. |
| 2006/0107181 A1 | 5/2006 | Dave et al. |
| 2006/0136570 A1 | 6/2006 | Pandya |
| 2006/0136655 A1 | 6/2006 | Gorobets et al. |
| 2006/0136681 A1 | 6/2006 | Jain et al. |
| 2006/0156177 A1 | 7/2006 | Kottapalli et al. |
| 2006/0184738 A1 | 8/2006 | Bridges et al. |
| 2006/0195650 A1 | 8/2006 | Su et al. |
| 2006/0209592 A1 | 9/2006 | Li et al. |
| 2006/0224841 A1 | 10/2006 | Terai et al. |
| 2006/0244049 A1 | 11/2006 | Yaoi et al. |
| 2006/0259528 A1 | 11/2006 | Dussud et al. |
| 2006/0265568 A1 | 11/2006 | Burton |
| 2006/0291301 A1 | 12/2006 | Ziegelmayer |
| 2007/0011413 A1 | 1/2007 | Nonaka et al. |
| 2007/0033376 A1 | 2/2007 | Sinclair et al. |
| 2007/0058446 A1 | 3/2007 | Hwang et al. |
| 2007/0061597 A1 | 3/2007 | Holtzman et al. |
| 2007/0076479 A1 | 4/2007 | Kim et al. |
| 2007/0081408 A1 | 4/2007 | Kwon et al. |
| 2007/0083697 A1 | 4/2007 | Birrell et al. |
| 2007/0088716 A1 | 4/2007 | Brumme et al. |
| 2007/0091677 A1 | 4/2007 | Lasser et al. |
| 2007/0101096 A1 | 5/2007 | Gorobets |
| 2007/0106679 A1* | 5/2007 | Perrin ............... G06F 17/30067 |
| 2007/0113019 A1 | 5/2007 | Beukema et al. |
| 2007/0133312 A1 | 6/2007 | Roohparvar |
| 2007/0147113 A1 | 6/2007 | Mokhlesi et al. |
| 2007/0150790 A1 | 6/2007 | Gross et al. |
| 2007/0156842 A1 | 7/2007 | Vermeulen et al. |
| 2007/0157064 A1 | 7/2007 | Falik et al. |
| 2007/0174579 A1 | 7/2007 | Shin |
| 2007/0180188 A1 | 8/2007 | Fujibayashi et al. |
| 2007/0180346 A1 | 8/2007 | Murin |
| 2007/0191993 A1 | 8/2007 | Wyatt |
| 2007/0201274 A1 | 8/2007 | Yu et al. |
| 2007/0208901 A1 | 9/2007 | Purcell et al. |
| 2007/0234143 A1 | 10/2007 | Kim |
| 2007/0245061 A1 | 10/2007 | Harriman |
| 2007/0245099 A1 | 10/2007 | Gray et al. |
| 2007/0263442 A1 | 11/2007 | Cornwell et al. |
| 2007/0268754 A1 | 11/2007 | Lee et al. |
| 2007/0277036 A1 | 11/2007 | Chamberlain et al. |
| 2007/0279988 A1 | 12/2007 | Nguyen |
| 2007/0291556 A1 | 12/2007 | Kamei |
| 2007/0294496 A1 | 12/2007 | Goss et al. |
| 2007/0300130 A1 | 12/2007 | Gorobets |
| 2008/0013390 A1 | 1/2008 | Zipprich-Rasch |
| 2008/0019182 A1 | 1/2008 | Yanagidaira et al. |
| 2008/0022163 A1 | 1/2008 | Tanaka et al. |
| 2008/0028275 A1 | 1/2008 | Chen et al. |
| 2008/0043871 A1 | 2/2008 | Latouche et al. |
| 2008/0052446 A1 | 2/2008 | Lasser et al. |
| 2008/0052451 A1 | 2/2008 | Pua et al. |
| 2008/0056005 A1 | 3/2008 | Aritome |
| 2008/0059602 A1 | 3/2008 | Matsuda et al. |
| 2008/0071971 A1 | 3/2008 | Kim et al. |
| 2008/0077841 A1 | 3/2008 | Gonzalez et al. |
| 2008/0077937 A1 | 3/2008 | Shin et al. |
| 2008/0086677 A1 | 4/2008 | Yang et al. |
| 2008/0112226 A1 | 5/2008 | Mokhlesi |
| 2008/0141043 A1 | 6/2008 | Flynn et al. |
| 2008/0144371 A1 | 6/2008 | Yeh et al. |
| 2008/0147714 A1 | 6/2008 | Breternitz et al. |
| 2008/0147964 A1 | 6/2008 | Chow et al. |
| 2008/0147998 A1 | 6/2008 | Jeong |
| 2008/0148124 A1 | 6/2008 | Zhang et al. |
| 2008/0163030 A1 | 7/2008 | Lee |
| 2008/0168191 A1 | 7/2008 | Biran et al. |
| 2008/0168319 A1 | 7/2008 | Lee et al. |

(56) References Cited

U.S. PATENT DOCUMENTS

| | | |
|---|---|---|
| 2008/0170460 A1 | 7/2008 | Oh et al. |
| 2008/0180084 A1 | 7/2008 | Dougherty et al. |
| 2008/0209282 A1 | 8/2008 | Lee et al. |
| 2008/0229000 A1 | 9/2008 | Kim |
| 2008/0229003 A1 | 9/2008 | Mizushima et al. |
| 2008/0229176 A1 | 9/2008 | Arnez et al. |
| 2008/0270680 A1 | 10/2008 | Chang |
| 2008/0282128 A1 | 11/2008 | Lee et al. |
| 2008/0285351 A1 | 11/2008 | Shlick et al. |
| 2008/0313132 A1 | 12/2008 | Hao et al. |
| 2008/0320110 A1 | 12/2008 | Pathak |
| 2009/0003046 A1 | 1/2009 | Nirschl et al. |
| 2009/0003058 A1 | 1/2009 | Kang |
| 2009/0019216 A1 | 1/2009 | Yamada et al. |
| 2009/0031083 A1 | 1/2009 | Willis et al. |
| 2009/0037652 A1 | 2/2009 | Yu et al. |
| 2009/0070608 A1 | 3/2009 | Kobayashi |
| 2009/0116283 A1 | 5/2009 | Ha et al. |
| 2009/0125671 A1 | 5/2009 | Flynn et al. |
| 2009/0144598 A1 | 6/2009 | Yoon et al. |
| 2009/0158288 A1 | 6/2009 | Fulton et al. |
| 2009/0168525 A1 | 7/2009 | Olbrich et al. |
| 2009/0172258 A1 | 7/2009 | Olbrich et al. |
| 2009/0172259 A1 | 7/2009 | Prins et al. |
| 2009/0172260 A1 | 7/2009 | Olbrich et al. |
| 2009/0172261 A1 | 7/2009 | Prins et al. |
| 2009/0172262 A1 | 7/2009 | Olbrich et al. |
| 2009/0172308 A1 | 7/2009 | Prins et al. |
| 2009/0172335 A1 | 7/2009 | Kulkarni et al. |
| 2009/0172499 A1 | 7/2009 | Olbrich et al. |
| 2009/0193058 A1 | 7/2009 | Reid |
| 2009/0204823 A1 | 8/2009 | Giordano et al. |
| 2009/0207660 A1 | 8/2009 | Hwang et al. |
| 2009/0213649 A1 | 8/2009 | Takahashi et al. |
| 2009/0222708 A1 | 9/2009 | Yamaga |
| 2009/0228761 A1 | 9/2009 | Perlmutter et al. |
| 2009/0235128 A1 | 9/2009 | Eun et al. |
| 2009/0249160 A1 | 10/2009 | Gao et al. |
| 2009/0251962 A1 | 10/2009 | Yun et al. |
| 2009/0268521 A1 | 10/2009 | Ueno et al. |
| 2009/0292972 A1 | 11/2009 | Seol et al. |
| 2009/0296466 A1 | 12/2009 | Kim et al. |
| 2009/0296486 A1 | 12/2009 | Kim et al. |
| 2009/0310422 A1 | 12/2009 | Edahiro et al. |
| 2009/0319864 A1 | 12/2009 | Shrader |
| 2010/0002506 A1 | 1/2010 | Cho et al. |
| 2010/0008175 A1 | 1/2010 | Sweere et al. |
| 2010/0011261 A1 | 1/2010 | Cagno et al. |
| 2010/0020620 A1 | 1/2010 | Kim et al. |
| 2010/0037012 A1 | 2/2010 | Yano et al. |
| 2010/0054034 A1 | 3/2010 | Furuta et al. |
| 2010/0061151 A1 | 3/2010 | Miwa et al. |
| 2010/0091535 A1 | 4/2010 | Sommer et al. |
| 2010/0103737 A1 | 4/2010 | Park |
| 2010/0110798 A1 | 5/2010 | Hoei et al. |
| 2010/0115206 A1 | 5/2010 | de la Iglesia et al. |
| 2010/0118608 A1 | 5/2010 | Song et al. |
| 2010/0138592 A1 | 6/2010 | Cheon |
| 2010/0153616 A1 | 6/2010 | Garratt |
| 2010/0161936 A1 | 6/2010 | Royer et al. |
| 2010/0174959 A1 | 7/2010 | No et al. |
| 2010/0185807 A1 | 7/2010 | Meng et al. |
| 2010/0199027 A1 | 8/2010 | Pucheral et al. |
| 2010/0199125 A1 | 8/2010 | Reche |
| 2010/0199138 A1 | 8/2010 | Rho |
| 2010/0202196 A1 | 8/2010 | Lee et al. |
| 2010/0202239 A1 | 8/2010 | Moshayedi et al. |
| 2010/0208521 A1 | 8/2010 | Kim et al. |
| 2010/0257379 A1 | 10/2010 | Wang et al. |
| 2010/0262889 A1 | 10/2010 | Bains |
| 2010/0281207 A1 | 11/2010 | Miller et al. |
| 2010/0281342 A1 | 11/2010 | Chang et al. |
| 2010/0306222 A1 | 12/2010 | Freedman et al. |
| 2010/0332858 A1 | 12/2010 | Trantham et al. |
| 2010/0332863 A1 | 12/2010 | Johnston |
| 2011/0010514 A1 | 1/2011 | Benhase et al. |
| 2011/0022779 A1 | 1/2011 | Lund et al. |
| 2011/0022819 A1 | 1/2011 | Post et al. |
| 2011/0051513 A1 | 3/2011 | Shen et al. |
| 2011/0066597 A1 | 3/2011 | Mashtizadeh et al. |
| 2011/0066806 A1 | 3/2011 | Chhugani et al. |
| 2011/0072207 A1* | 3/2011 | Jin ................ G06F 17/30368 |
| | | 711/112 |
| 2011/0072302 A1 | 3/2011 | Sartore |
| 2011/0078407 A1* | 3/2011 | Lewis ............ G06F 17/30191 |
| | | 711/213 |
| 2011/0078496 A1 | 3/2011 | Jeddeloh |
| 2011/0083060 A1 | 4/2011 | Sakurada et al. |
| 2011/0099460 A1 | 4/2011 | Dusija et al. |
| 2011/0113281 A1 | 5/2011 | Zhang et al. |
| 2011/0122691 A1 | 5/2011 | Sprouse |
| 2011/0131444 A1 | 6/2011 | Buch et al. |
| 2011/0138260 A1 | 6/2011 | Savin |
| 2011/0173378 A1 | 7/2011 | Filor et al. |
| 2011/0179249 A1 | 7/2011 | Hsiao |
| 2011/0199825 A1 | 8/2011 | Han et al. |
| 2011/0205823 A1 | 8/2011 | Hemink et al. |
| 2011/0213920 A1 | 9/2011 | Frost et al. |
| 2011/0222342 A1 | 9/2011 | Yoon et al. |
| 2011/0225346 A1 | 9/2011 | Goss et al. |
| 2011/0225347 A1 | 9/2011 | Goss et al. |
| 2011/0228601 A1 | 9/2011 | Olbrich et al. |
| 2011/0231600 A1 | 9/2011 | Tanaka et al. |
| 2011/0239077 A1 | 9/2011 | Bai et al. |
| 2011/0264843 A1 | 10/2011 | Haines et al. |
| 2011/0271040 A1 | 11/2011 | Kamizono |
| 2011/0283119 A1 | 11/2011 | Szu et al. |
| 2011/0289125 A1* | 11/2011 | Guthery ............. G06F 12/023 |
| | | 707/818 |
| 2011/0320733 A1 | 12/2011 | Sanford et al. |
| 2012/0011393 A1 | 1/2012 | Roberts et al. |
| 2012/0017053 A1 | 1/2012 | Yang et al. |
| 2012/0023144 A1 | 1/2012 | Rub |
| 2012/0026799 A1 | 2/2012 | Lee |
| 2012/0054414 A1 | 3/2012 | Tsai et al. |
| 2012/0063234 A1 | 3/2012 | Shiga et al. |
| 2012/0072639 A1 | 3/2012 | Goss et al. |
| 2012/0096217 A1 | 4/2012 | Son et al. |
| 2012/0110250 A1 | 5/2012 | Sabbag et al. |
| 2012/0117317 A1 | 5/2012 | Sheffler |
| 2012/0117397 A1 | 5/2012 | Kolvick et al. |
| 2012/0124273 A1 | 5/2012 | Goss et al. |
| 2012/0131286 A1 | 5/2012 | Faith et al. |
| 2012/0151124 A1 | 6/2012 | Baek et al. |
| 2012/0151253 A1 | 6/2012 | Horn |
| 2012/0151294 A1 | 6/2012 | Yoo et al. |
| 2012/0173797 A1 | 7/2012 | Shen |
| 2012/0173826 A1 | 7/2012 | Takaku |
| 2012/0185750 A1 | 7/2012 | Hayami |
| 2012/0195126 A1 | 8/2012 | Roohparvar |
| 2012/0203804 A1 | 8/2012 | Burka et al. |
| 2012/0203951 A1 | 8/2012 | Wood et al. |
| 2012/0210095 A1* | 8/2012 | Nellans ............... G06F 12/1072 |
| | | 711/206 |
| 2012/0216079 A1 | 8/2012 | Fai et al. |
| 2012/0233391 A1 | 9/2012 | Frost et al. |
| 2012/0236658 A1 | 9/2012 | Byom et al. |
| 2012/0239858 A1 | 9/2012 | Melik-Martirosian |
| 2012/0239868 A1 | 9/2012 | Ryan et al. |
| 2012/0239976 A1 | 9/2012 | Cometti et al. |
| 2012/0246204 A1 | 9/2012 | Nalla et al. |
| 2012/0259863 A1 | 10/2012 | Bodwin et al. |
| 2012/0275466 A1 | 11/2012 | Bhadra et al. |
| 2012/0278564 A1 | 11/2012 | Goss et al. |
| 2012/0284574 A1 | 11/2012 | Avila et al. |
| 2012/0284587 A1 | 11/2012 | Yu et al. |
| 2012/0297122 A1 | 11/2012 | Gorobets |
| 2013/0007073 A1 | 1/2013 | Varma |
| 2013/0007343 A1 | 1/2013 | Rub et al. |
| 2013/0007381 A1 | 1/2013 | Palmer |
| 2013/0007543 A1 | 1/2013 | Goss et al. |
| 2013/0024735 A1 | 1/2013 | Chung et al. |
| 2013/0031438 A1 | 1/2013 | Hu et al. |
| 2013/0036418 A1 | 2/2013 | Yadappanavar et al. |

(56) References Cited

U.S. PATENT DOCUMENTS

| | | |
|---|---|---|
| 2013/0038380 A1 | 2/2013 | Cordero et al. |
| 2013/0047045 A1 | 2/2013 | Hu et al. |
| 2013/0058145 A1 | 3/2013 | Yu et al. |
| 2013/0070527 A1 | 3/2013 | Sabbag et al. |
| 2013/0073784 A1 | 3/2013 | Ng et al. |
| 2013/0073798 A1 | 3/2013 | Kang et al. |
| 2013/0073924 A1 | 3/2013 | D'Abreu et al. |
| 2013/0079942 A1 | 3/2013 | Smola et al. |
| 2013/0086131 A1 | 4/2013 | Hunt et al. |
| 2013/0086132 A1 | 4/2013 | Hunt et al. |
| 2013/0094288 A1 | 4/2013 | Patapoutian et al. |
| 2013/0103978 A1 | 4/2013 | Akutsu |
| 2013/0110891 A1 | 5/2013 | Ogasawara et al. |
| 2013/0111279 A1 | 5/2013 | Jeon et al. |
| 2013/0111298 A1 | 5/2013 | Seroff et al. |
| 2013/0117606 A1 | 5/2013 | Anholt et al. |
| 2013/0121084 A1 | 5/2013 | Jeon et al. |
| 2013/0124792 A1 | 5/2013 | Melik-Martirosian et al. |
| 2013/0124888 A1 | 5/2013 | Tanaka et al. |
| 2013/0128666 A1 | 5/2013 | Avila et al. |
| 2013/0132647 A1 | 5/2013 | Melik-Martirosian |
| 2013/0132652 A1 | 5/2013 | Wood et al. |
| 2013/0159609 A1 | 6/2013 | Haas et al. |
| 2013/0176784 A1 | 7/2013 | Cometti et al. |
| 2013/0179646 A1 | 7/2013 | Okubo et al. |
| 2013/0191601 A1 | 7/2013 | Peterson et al. |
| 2013/0194865 A1 | 8/2013 | Bandic et al. |
| 2013/0194874 A1 | 8/2013 | Mu et al. |
| 2013/0232289 A1 | 9/2013 | Zhong et al. |
| 2013/0238576 A1 | 9/2013 | Binkert et al. |
| 2013/0254498 A1 | 9/2013 | Adachi et al. |
| 2013/0254507 A1 | 9/2013 | Islam et al. |
| 2013/0258738 A1 | 10/2013 | Barkon et al. |
| 2013/0265838 A1 | 10/2013 | Li |
| 2013/0282955 A1 | 10/2013 | Parker et al. |
| 2013/0290611 A1 | 10/2013 | Biederman et al. |
| 2013/0297613 A1 | 11/2013 | Yu |
| 2013/0301373 A1 | 11/2013 | Tam |
| 2013/0304980 A1 | 11/2013 | Nachimuthu et al. |
| 2013/0314988 A1 | 11/2013 | Desireddi et al. |
| 2013/0343131 A1 | 12/2013 | Wu et al. |
| 2013/0346672 A1 | 12/2013 | Sengupta et al. |
| 2014/0013027 A1 | 1/2014 | Jannyavula Venkata et al. |
| 2014/0013188 A1 | 1/2014 | Wu et al. |
| 2014/0025864 A1 | 1/2014 | Zhang et al. |
| 2014/0032890 A1 | 1/2014 | Lee et al. |
| 2014/0063905 A1 | 3/2014 | Ahn et al. |
| 2014/0067761 A1* | 3/2014 | Chakrabarti ...... G06F 17/30359 707/634 |
| 2014/0071761 A1 | 3/2014 | Sharon et al. |
| 2014/0075133 A1 | 3/2014 | Li et al. |
| 2014/0082261 A1 | 3/2014 | Cohen et al. |
| 2014/0082310 A1 | 3/2014 | Nakajima |
| 2014/0082456 A1 | 3/2014 | Li et al. |
| 2014/0082459 A1 | 3/2014 | Li et al. |
| 2014/0095775 A1 | 4/2014 | Talagala et al. |
| 2014/0101389 A1 | 4/2014 | Nellans et al. |
| 2014/0115238 A1 | 4/2014 | Xi et al. |
| 2014/0122818 A1 | 5/2014 | Hayasaka et al. |
| 2014/0122907 A1 | 5/2014 | Johnston |
| 2014/0136762 A1 | 5/2014 | Li et al. |
| 2014/0136883 A1 | 5/2014 | Cohen |
| 2014/0136927 A1 | 5/2014 | Li et al. |
| 2014/0143505 A1 | 5/2014 | Sim et al. |
| 2014/0153333 A1 | 6/2014 | Avila et al. |
| 2014/0157065 A1 | 6/2014 | Ong |
| 2014/0173224 A1 | 6/2014 | Fleischer et al. |
| 2014/0181458 A1 | 6/2014 | Loh et al. |
| 2014/0201596 A1 | 7/2014 | Baum et al. |
| 2014/0223084 A1 | 8/2014 | Lee et al. |
| 2014/0244578 A1 | 8/2014 | Winkelstraeter |
| 2014/0258755 A1 | 9/2014 | Stenfort |
| 2014/0269090 A1 | 9/2014 | Flynn et al. |
| 2014/0279909 A1 | 9/2014 | Sudarsanam et al. |
| 2014/0310494 A1 | 10/2014 | Higgins et al. |
| 2014/0359044 A1 | 12/2014 | Davis et al. |
| 2014/0359381 A1 | 12/2014 | Takeuchi et al. |
| 2015/0023097 A1 | 1/2015 | Khoueir et al. |
| 2015/0032967 A1 | 1/2015 | Udayashankar et al. |
| 2015/0037624 A1 | 2/2015 | Thompson et al. |
| 2015/0153799 A1 | 6/2015 | Lucas et al. |
| 2015/0153802 A1 | 6/2015 | Lucas et al. |
| 2015/0212943 A1 | 7/2015 | Yang et al. |
| 2015/0268879 A1 | 9/2015 | Chu |
| 2015/0286438 A1 | 10/2015 | Simionescu et al. |

FOREIGN PATENT DOCUMENTS

| | | |
|---|---|---|
| EP | 1 990 921 A2 | 11/2008 |
| EP | 2 386 958 A1 | 11/2011 |
| EP | 2 620 946 A2 | 7/2013 |
| JP | 2002-532806 S | 10/2002 |
| WO | WO 2007/036834 A2 | 4/2007 |
| WO | WO 2007/080586 A2 | 7/2007 |
| WO | WO 2008/075292 | 6/2008 |
| WO | WO 2008/121553 A1 | 10/2008 |
| WO | WO 2008/121577 A1 | 10/2008 |
| WO | WO 2009/028281 A1 | 3/2009 |
| WO | WO 2009/032945 A1 | 3/2009 |
| WO | WO 2009/058140 A1 | 5/2009 |
| WO | WO 2009/084724 | 7/2009 |
| WO | WO 2009/134576 A1 | 11/2009 |
| WO | WO 2011/024015 | 3/2011 |

OTHER PUBLICATIONS

Canim, Buffered Bloom ilters on Solid State Storage, ADMS*10, Singapore, Sep. 13-17, 2010, 8 pgs.
Kang, A Multi-Channel Architecture for High-Performance NAND Flash-Based Storage System, J. Syst. Archit., 53, 9, Sep. 2007, 15 pgs.
Kim, A Space-Efficient Flash Translation Layer for CompactFlash Systems, May 2002, 10 pgs.
Lu, A Forest-structured Bloom Filter with Flash Memory, MSST 2011, Denver, CO, May 23-27, 2011, article, 6 pgs.
Lu, A Forest-structured Bloom Filter with Flash Memory, MSST 2011, Denver, CO, May 23-27, 2011, presentation slides, 25 pgs.
McLean, Information Technology-AT Attachment with Packet Interface Extension, Aug. 19, 1998, 339 pgs.
Park, A High Performance Controller for NAND Flash-Based Solid State Disk (NSSD), Feb. 12-16, 2006, 4 pgs.
Pliant Technology, International Search Report / Written Opinion, PCT/US08/88133, Mar. 19, 2009, 7 pgs.
Pliant Technology, International Search Report / Written Opinion, PCT/US08/88136, Mar. 19, 2009, 7 pgs.
Pliant Technology, International Search Report / Written Opinion, PCT/US08/88146, Feb. 26, 2009, 10 pgs.
Pliant Technology, International Search Report / Written Opinion, PCT/US08/88154, Feb. 27, 2009, 8 pgs.
Pliant Technology, International Search Report / Written Opinion, PCT/US08/88164, Feb. 13, 2009, 6 pgs.
Pliant Technology, International Search Report / Written Opinion, PCT/US08/88206, Feb. 18, 2009, 8 pgs.
Pliant Technology, International Search Report / Written Opinion, PCT/US08/88217, Feb. 19, 2009, 7 pgs.
Pliant Technology, International Search Report / Written Opinion, PCT/US08/88229, Feb. 13, 2009, 7 pgs.
Pliant Technology, International Search Report / Written Opinion, PCT/US08/88232, Feb. 19, 2009, 8 pgs.
Pliant Technology, International Search Report / Written Opinion, PCT/US08/88236, Feb. 19, 2009, 7 pgs.
Pliant Technology, International Search Report / Written Opinion, PCT/US2011/028637, Oct. 27, 2011, 11 pgs.
Pliant Technology, Supplementary ESR, 08866997.3, Feb. 23, 2012, 6 pgs.
SanDisk Enterprise IP LLC, International Search Report / Written Opinion, PCT/US2012/042764, Aug. 31, 2012, 12 pgs.
SanDisk Enterprise IP LLC, International Search Report / Written Opinion, PCT/US2012/042771, Mar. 4, 2013, 14 pgs.

(56) References Cited

OTHER PUBLICATIONS

SanDisk Enterprise IP LLC, International Search Report / Written Opinion, PCT/US2012/042775, Sep. 26, 2012, 8 pgs.
SanDisk Enterprise IP LLC, International Search Report / Written Opinion, PCT/US2012/059447, Jun. 6, 2013, 12 pgs.
SanDisk Enterprise IP LLC, International Search Report / Written Opinion, PCT/US2012/059453, Jun. 6, 2013, 12 pgs.
Sandisk Enterprise IP LLC, International Search Report / Written Opinion, PCT/US2012/059459, Feb. 14, 2013, 9 pgs.
SanDisk Enterprise IP LLC, International Search Report / Written Opinion, PCT/US2012/065914, May 23, 2013, 7 pgs.
SanDisk Enterprise IP LLC, International Search Report / Written Opinion, PCT/US2012/065916, Apr. 5, 2013, 7 pgs.
SanDisk Enterprise IP LLC, International Search Report / Written Opinion, PCT/US2012/065919, Jun. 17, 2013, 8 pgs.
SanDisk Enterprise IP LLC, Notification of the Decision to Grant a Patent Right for Patent for Invention, CN 200880127623.8, Jul. 4, 2013, 1 pg.
SanDisk Enterprise IP LLC, Office Action, CN 200880127623.8, Apr. 18, 2012, 12 pgs.
SanDisk Enterprise IP LLC, Office Action, CN 200880127623.8, Dec. 31, 2012, 9 pgs.
SanDisk Enterprise IP LLC, Office Action, JP 2010-540863, Jul. 24, 2012, 3 pgs.
Watchdog Timer and Power Savin Modes, Microchip Technology Inc., 2005, 14 pgs.
Zeidman, 1999 Verilog Designer's Library, 9 pgs.
Ashkenazi et al., "Platform independent overall security architecture in multi-processor system-on-chip integrated circuits for use in mobile phones and handheld devices," ScienceDirect, Computers and Electrical Engineering 33 (2007), 18 pages.
Lee et al., "A Semi-Preemptive Garbage Collector for Solid State Drives," Apr. 2011, IEEE, pp. 12-21.
Office Action dated Feb. 17, 2015, received in Chinese Patent Application No. 201210334987.1, which corresponds to U.S. Appl. No. 12/082,207, 9 pages (Prins).
International Search Report and Written Opinion dated May 4, 2015, received in International Patent Application No. PCT/US2014/065987, which corresponds to U.S. Appl. No. 14/135,400, 12 pages (George).
International Search Report and Written Opinion dated Mar. 17, 2015, received in International Patent Application No. PCT/US2014/067467, which corresponds to U.S. Appl. No. 14/135,420, 13 pages (Lucas).
International Search Report and Written Opinion dated Apr. 20, 2015, received in International Patent Application No. PCT/US2014/063949, which corresponds to U.S. Appl. No. 14/135,433, 21 pages (Delpapa).
International Search Report and Written Opinion dated Mar. 9, 2015, received in International Patent Application No. PCT/US2014/059747, which corresponds to U.S. Appl. No. 14/137,440, 9 pages (Fitzpatrick).
Invitation to Pay Additional Fees dated Feb. 13, 2015, received in International Patent Application No. PCT/US2014/063949, which corresponds to U.S. Appl. No. 14/135,433, 6 pages (Delpapa).
International Search Report and Written Opinion dated Jan. 21, 2015, received in International Application No. PCT/US2014/059748, which corresponds to U.S. Appl. No 14/137,511, 13 pages (Dancho).
International Search Report and Written Opinion dated Feb. 18, 2015, received in International Application No. PCT/US2014/066921, which corresponds to U.S. Appl. No. 14/135,260, 13 pages (Fitzpatrick).
Bayer, "Prefix B-Trees", IP.Com Journal, IP.Com Inc., West Henrietta, NY, Mar. 30, 2007, 29 pages.
Bhattacharjee et al., "Efficient Index Compression in DB2 LUW", IBM Research Report, Jun. 23, 2009, http://domino.research.ibm.com/library/cyberdig.nsf/papers/40B2C45876D0D747852575E100620CE7/$File/rc24815.pdf, 13 pages.

Oracle, "Oracle9i: Database Concepts", Jul. 2001, http://docs.oracle.com/cd/A91202_01/901_doc/server.901/a88856.pdf, 49 pages.
International Search Report and Written Opinion dated Jun. 8, 2015, received in International Patent Application No. PCT/US2015/018252, which corresponds to U.S. Appl. No. 14/339,072, 9 pages (Busch).
International Search Report and Written Opinion dated Jun. 2, 2015, received in International Patent Application No. PCT/US2015/018255, which corresponds to U.S. Appl. No. 14/336,967, 14 pages (Chander).
International Search Report and Written Opinion dated Jun. 30, 2015, received in International Patent Application No. PCT/US2015/023927, which corresponds to U.S. Appl. No. 14/454,687, 11 pages (Kadayam).
Office Action dated Dec. 8, 2014, received in Chinese Patent Application No. 201180021660.2, which corresponds to U.S. Appl. No. 12/726,200, 7 pages (Olbrich).
Office Action dated Jul. 31, 2015, received in Chinese Patent Application No. 201180021660.2, which corresponds to U.S. Appl. No. 12/726,200, 9 pages (Olbrich).
International Search Report and Written Opinion dated Jul. 23, 2015, received in International Patent Application No. PCT/US2015/030850, which corresponds to U.S. Appl. No. 14/298,843, 12 pages (Ellis).
International Search Report and Written Opinion dated Sep. 14, 2015, received in International Patent Application No. PCT/US2015/036807, which corresponds to U.S. Appl. No. 14/311,152, 9 pages (Higgins).
Gasior, "Gigabyte's i-Ram storage device, Ram disk without the fuss," The Tech Report, p. 1, Jan. 25, 2006, 5 pages.
Oestreicher et al., "Object Lifetimes in Java Card," 1999, USENIX, 10 pages.
International Preliminary Report on Patentability dated May 24, 2016, received in International Patent Application No. PCT/US2014/065987, which corresponds to U.S. Appl. No. 14/135,400, 9 pages (George).
IBM Research—Zurich, "The Fundamental Limit of Flash Random Write Performance: Understanding, Analysis and Performance Modeling," Mar. 31, 2010, pp. 1-15.
International Search Report and Written Opinion dated Jul. 25, 2014, received in International Patent Application No. PCT/US2014/029453, which corresponds to U.S. Appl. No. 13/963,444, 9 pages (Frayer).
International Search Report and Written Opinion dated Mar. 7, 2014, received in International Patent Application No. PCT/US2013/074772, which corresponds to U.S. Appl. No. 13/831,218, 10 pages (George).
International Search Report and Written Opinion dated Mar. 24, 2014, received in International Patent Application No. PCT/US2013/074777, which corresponds to U.S. Appl. No. 13/831,308, 10 pages (George).
International Search Report and Written Opinion dated Mar. 7, 2014, received in International Patent Application No. PCT/US2013/074779, which corresponds to U.S. Appl. No. 13/831,374, 8 pages (George).
Office Action dated Apr. 25, 2016, received in Chinese Patent Application No. 201280066282.4, which corresponds to U.S. Appl. No. 13/602,047, 8 pages (Tai).
International Preliminary Report on Patentability dated Dec. 6, 2016, received in International Patent Application No. PCT/US2015/030850, which corresponds to U.S. Appl. No. 14/298,843, 8 pages (Ellis).
International Preliminary Report on Patentability dated Dec. 20, 2016, received in International Patent Application No. PCT/US2015/036807, which corresponds to U.S. Appl. No. 14/311,152, 6 pages (Higgins).
Office Action dated Jan. 11, 2017, received in Chinese Patent Application No. 201280066282.4, which corresponds to U.S. Appl. No. 13/602,047, 3 pages (Tai).

* cited by examiner

Record 702: | Metadata | Log Entry | Reference Identifier | Forward Reference Identifier | Forward Reference Address | Write Data 704 |

Record 710: | Metadata | Log Entry 712 | Reference Identifier | Forward Reference Identifier | Forward Reference Address 716 | Tombstone 714 |

Figure 7

METHOD AND SYSTEM FOR FORWARD REFERENCE LOGGING IN A PERSISTENT DATASTORE

RELATED APPLICATIONS

This application claims priority to U.S. Provisional Patent Application No. 61/906,406, filed Nov. 19, 2013, which is hereby incorporated by reference in its entirety.

TECHNICAL FIELD

The disclosed embodiments relate generally to memory systems, and in particular, to improving the reliability and performance of a storage medium (e.g., a persistent datastore including non-volatile memory such as flash memory).

BACKGROUND

Generally, when data is written to a database to be persisted, two writes are initiated to persistent storage, one for the data and a second for the corresponding log entry. The log entry is for recovering the data, or for reproducing the corresponding write operation. Performing two separate write operations introduces more latency than a single write operation, but writing the log entry to persistent storage provides recovery and database replication capabilities not otherwise available. Nevertheless, reducing the added latency associated with writing log entries would be desirable.

SUMMARY

The disclosed method and system improve the reliability and performance of a persistent datastore (e.g., non-volatile memory such as flash memory). A record including write data and a log entry is written to the persistent datastore with a single write operation.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate the more pertinent features of the present disclosure and are therefore not to be considered limiting, for the description may admit to other effective features.

FIG. 7 illustrates block diagrams of related data structures in accordance with some embodiments.

Figure 1:
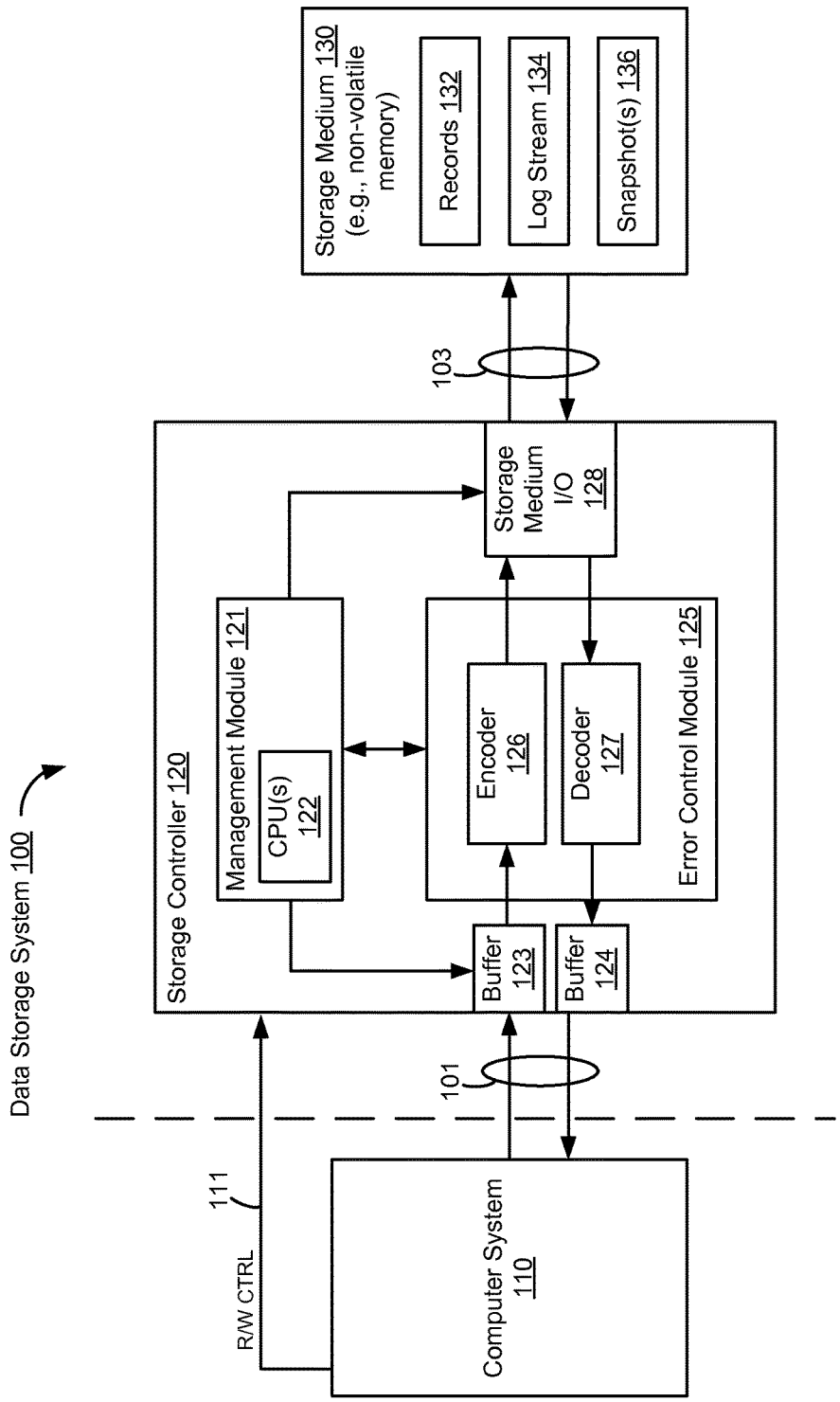
FIG. 1 is a block diagram illustrating an implementation of a data storage system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various embodiments described herein include methods and/or systems that improve the reliability and performance of a persistent datastore (e.g., non-volatile memory (NVM) such as flash memory). Some embodiments include methods and/or systems (or devices) for persisting data efficiently and reliably as part of a persistent datastore.

Some embodiments include a method of persisting data. In some embodiments, the method is performed by an electronic system (e.g., computer system 110, FIG. 1 or storage controller 120, FIG. 1) with one or more processors and memory that is operatively coupled with a persistent datastore. For example, the persistent datastore includes non-volatile memory such as one or more magnetic disk storage devices, optical disk storage devices, flash memory devices, or other non-volatile solid state storage devices. The method includes generating a log entry associated with first write data. The method also includes generating a first record including the log entry, the first write data, and a pointer to a second record different from the first record. The method further includes performing a single write operation that includes writing the first record to the persistent datastore.

Some embodiments include an electronic system (sometimes herein called an electronic device), comprising: one or more processors; and memory storing one or more programs to be executed by the one or more processors, the one or more programs comprising instructions for performing or controlling performance of any of the methods described herein. Some embodiments include a non-transitory computer readable storage medium, storing one or more programs for execution by one or more processors of an electronic system or device, the one or more programs including instructions for performing any of the methods described herein. Some embodiments include an electronic system or device comprising: means for performing the operations of any of the methods described herein.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the embodiments described herein.

FIG. 1 is a diagram of an implementation of a data storage system 100 in accordance with some embodiments. While some example features are illustrated, various other features have not been illustrated for the sake of brevity and so as not to obscure more pertinent aspects of the example embodiments disclosed herein. To that end, as a non-limiting example, data storage system 100 includes a storage controller 120, and a storage medium 130, and is used in conjunction with a computer system 110. In some embodiments, storage medium 130 includes a single memory device (e.g., a non-volatile memory (NVM) device such as a flash memory device or a magnetic disk drive, sometimes called a hard drive) while in other implementations storage medium 130 includes a plurality of memory devices. In some embodiments, storage medium 130 includes NAND-type flash memory or NOR-type flash memory. Further, in some embodiments, storage controller 120 is a solid-state drive (SSD) controller. However, one or more other types of storage media may be included in accordance with aspects of a wide variety of embodiments.

Computer system 110 is coupled to storage controller 120 through data connections 101. However, in some embodiments computer system 110 includes storage controller 120 as a component and/or a sub-system. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host or host system. In some embodiments, computer system 110 includes one or more processors, one or more types of memory, a display and/or other user interface components such as a keyboard, a touch screen display, a mouse, a track-pad, a digital camera and/or any number of supplemental devices to add functionality.

Storage medium 130 is coupled to storage controller 120 through connections 103. Connections 103 are sometimes called data connections, but typically convey commands in addition to data, and optionally convey metadata, error correction information and/or other information in addition to data values to be stored in storage medium 130 and data values read from storage medium 130. In some embodiments, however, storage controller 120 and storage medium 130 are included in the same device as components thereof. Furthermore, in some implementations storage controller 120 and storage medium 130 are embedded in a host device, such as a mobile device, tablet, other computer or computer controlled device, and the methods described herein are performed by the embedded storage controller. Storage medium 130 may include any number (i.e., one or more) of memory devices including, without limitation, non-volatile semiconductor memory devices, such as flash memory. For example, flash memory devices can be configured for enterprise storage suitable for applications such as cloud computing, or for caching data stored (or to be stored) in secondary storage, such as hard disk drives. Additionally and/or alternatively, flash memory can also be configured for relatively smaller-scale applications such as personal flash drives or hard-disk replacements for personal, laptop and tablet computers.

In some embodiments, storage medium 130 is a persistent datastore (e.g., comprising non-volatile memory such as flash memory), and storage medium 130 includes a plurality of records 132 each including write data and a corresponding log entry. In some embodiments, each record corresponds to a transaction (e.g., a write operation) against the persistent datastore. In some embodiments, storage medium 130 also includes a log stream 134 comprising a plurality of log stream portions, where each log stream portion includes a log entry collection (e.g., 256 log entries). In some embodiments, storage medium 130 further includes one or more datastore snapshots 136. In some embodiments, each of one or more datastore snapshots 136 corresponds to the state(s) of one or more datastore tables at a point in time, where the one or more datastore tables enable the host to access data stored in the persistent datastore. For example, a snapshot of the one or more datastore tables is generated every N transactions (e.g., N=1000, 10000, etc.).

In some embodiments, storage medium 130 is divided into a number of addressable and individually selectable blocks. In some embodiments, the individually selectable blocks are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

For example, one block comprises any number of pages, for example, 64 pages, 128 pages, 256 pages or another suitable number of pages. Blocks are typically grouped into a plurality of zones. Each block zone can be independently managed to some extent, which increases the degree of parallelism for parallel operations and simplifies management of storage medium 130.

In some embodiments, storage controller 120 includes a management module 121, an input buffer 123, an output buffer 124, an error control module 125 and a storage medium interface (I/O) 128. Storage controller 120 may include various additional features that have not been illustrated for the sake of brevity and so as not to obscure more pertinent features of the example embodiments disclosed herein, and that a different arrangement of features may be possible. Input and output buffers 123, 124 provide an interface to computer system 110 through data connections 101. Similarly, storage medium I/O 128 provides an interface to storage medium 130 though connections 103. In some embodiments, storage medium I/O 128 includes read and write circuitry, including circuitry capable of providing reading signals to storage medium 130 (e.g., reading threshold voltages for NAND-type flash memory).

In some embodiments, management module 121 includes one or more processing units (CPU(s), also sometimes called one or more processors) 122 configured to execute instructions in one or more programs (e.g., in management module 121). In some embodiments, one or more CPUs 122 are shared by one or more components within, and in some cases, beyond the function of storage controller 120. Management module 121 is coupled to input buffer 123, output buffer 124 (connection not shown), error control module 125 and storage medium I/O 128 in order to coordinate the operation of these components.

Error control module 125 is coupled to storage medium I/O 128, input buffer 123 and output buffer 124. Error control module 125 is provided to limit the number of uncorrectable errors inadvertently introduced into data. In some embodiments, error control module 125 is executed in software by one or more CPUs 122 of management module 121, and, in other embodiments, error control module 125 is implemented in whole or in part using special purpose circuitry to perform encoding and decoding functions. To that end, error control module 125 includes an encoder 126 and a decoder 127. Encoder 126 encodes data by applying an error control code to produce a codeword, which is subsequently stored in storage medium 130.

When the encoded data (e.g., one or more codewords) is read from storage medium 130, decoder 127 applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

During a write operation, input buffer 123 receives data to be stored in storage medium 130 from computer system 110 (e.g., write data). The data held in input buffer 123 is made available to encoder 126, which encodes the data to produce one or more codewords. The one or more codewords are made available to storage medium I/O 128, which transfers the one or more codewords to storage medium 130 in a manner dependent on the type of storage medium being utilized.

A read operation is initiated when computer system (host) 110 sends one or more host read commands on control line 111 to storage controller 120 requesting data from storage medium 130. Storage controller 120 sends one or more read access commands to storage medium 130, via storage medium I/O 128, to obtain raw read data in accordance with memory locations (addresses) specified by the one or more host read commands. Storage medium I/O 128 provides the raw read data (e.g., comprising one or more codewords) to decoder 127. If the decoding is successful, the decoded data is provided to output buffer 124, where the decoded data is made available to computer system 110. In some embodiments, if the decoding is not successful, storage controller 120 may resort to a number of remedial actions or provide an indication of an irresolvable error condition.

Figure 2A:
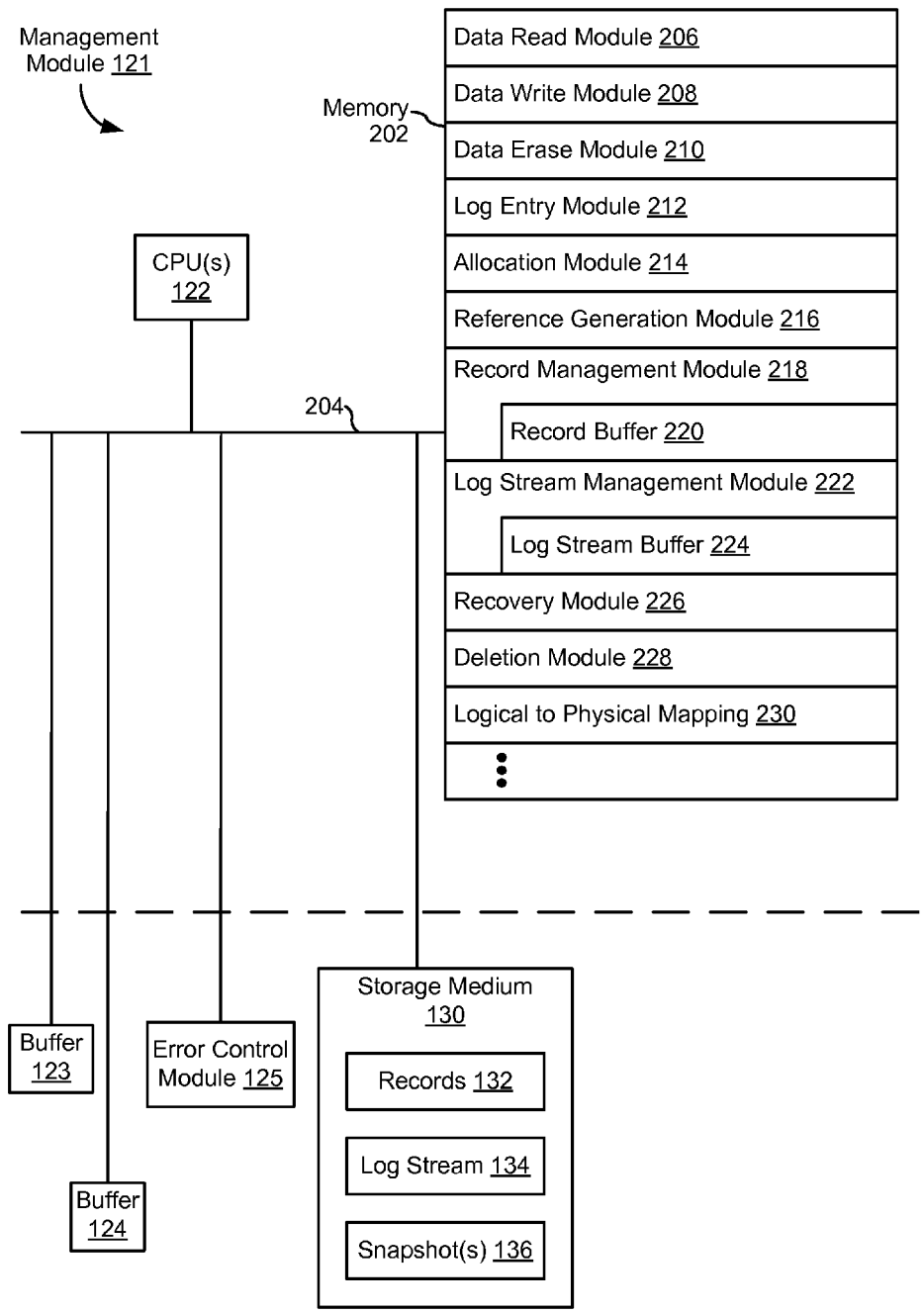
FIG. 2A is a block diagram illustrating an implementation of a management module in accordance with some embodiments.

FIG. 2A is a block diagram illustrating an exemplary management module 121 in accordance with some embodiments. Management module 121 typically includes: one or more processing units (CPUs) 122 for executing modules, programs and/or instructions stored in memory 202 and thereby performing processing operations; memory 202; and one or more communication buses 204 for interconnecting these components. One or more communication buses 204, optionally, include circuitry (sometimes called a chipset) that interconnects and controls communications between system components. Management module 121 is operatively coupled with buffer 123, buffer 124, error control module 125, and storage medium 130 (e.g., through storage medium I/O 128) by one or more communication buses 204. Memory 202 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 202, optionally, includes one or more storage devices remotely located from one or more CPUs 122. Memory 202, or alternatively the non-volatile memory device(s) within memory 202, comprises a non-transitory computer readable storage medium. In some embodiments, memory 202, or the non-transitory computer readable storage medium of memory 202, stores the following programs, modules, and data structures, or a subset or superset thereof:

- data read module 206 for performing a read operation to read data from storage medium 130 (e.g., a persistent data store including non-volatile memory such as flash memory) according to a read command from computer system 110;
- data write module 208 for performing a write operation to write data (e.g., a record including write data and a log entry) to storage medium 130 according to a write command from computer system 110;
- data erase module 210 for performing an erase operation to erase data from storage medium 130 according to an erase command from computer system 110;
- log entry module 212 for generating a log entry associated with respective write data;
- allocation module 214 for allocating a portion (e.g., a set of logical addresses) of storage medium 130 for a record;
- reference generation module 216 for generating a reference identifier for a record;
- record management module 218 for generating a record by populating a plurality of fields of the record with previously generated values and obtained data; for example, a record may include the following fields (or a subset of these fields): metadata, log entry, reference identifier for the record, forward reference identifier for a next record, forward reference address associated with the portion of storage medium 130 allocated for the next record, and write data; in some embodiments, the previously generated values and obtained data are temporarily stored in record buffer 220;
- log stream management module 222 for batching a plurality of log entries temporarily stored in log stream buffer 224 into a log entry collection, and writing a log stream portion to log stream 134 in storage medium 130; the log stream portion includes the log entry collection and a reference pair (e.g., including a forward reference identifier and a forward reference addresses associated with a next record); in some embodiments, the log stream portion includes more than one reference pair, as explained in more detail below;
- recovery module 226 for performing a recovery process, or causing a recovery process to be performed, in response to detecting an error condition or synchronization command;
- deletion module 228 for deleting a record from storage medium 130; and
- logical to physical mapping 230, which maps logical addresses to physical addresses for respective portions of storage medium 130, and optionally also maps physical addresses for respective portions of storage medium 130 to logical addresses.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 202 stores a subset of the modules and data structures identified above. Furthermore, memory 202 may store additional modules and data structures not described above. In some embodiments, the programs, modules, and data structures stored in memory 202, or the non-transitory computer readable storage medium of memory 202, provide instructions for implementing any of the methods described below with reference to FIGS. 8A-8C.

Figure 2B:
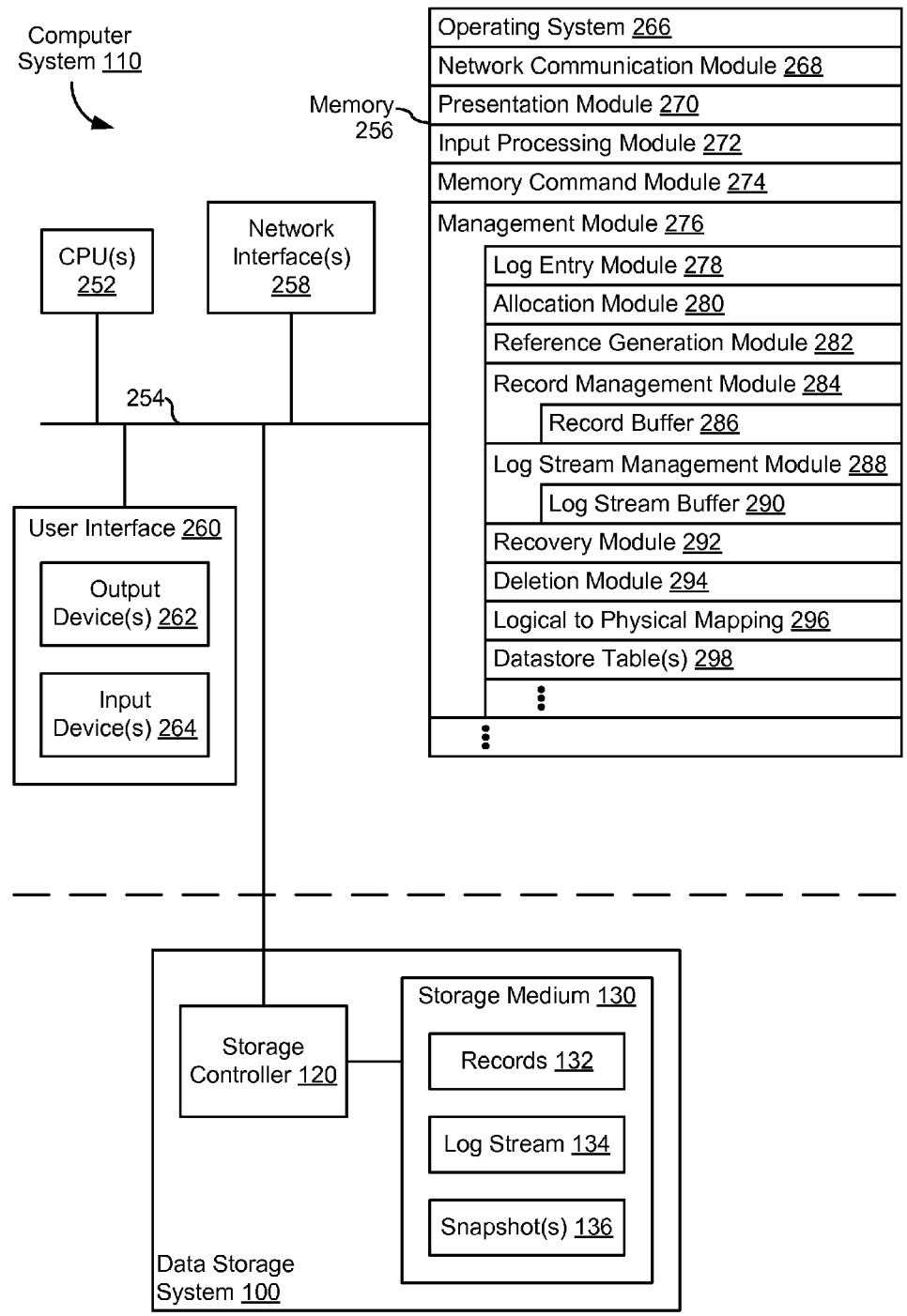
FIG. 2B is a block diagram illustrating an implementation of a computer system (e.g., a host) in accordance with some embodiments.

FIG. 2B is a block diagram illustrating a computer system 110 (e.g., a host) in accordance with some embodiments. Computer system 110 typically includes: one or more processing units (CPUs) 252 for executing modules, programs and/or instructions stored in memory 256 and thereby performing processing operations; memory 256; one or more network interfaces 258; and one or more communication buses 254 for interconnecting these components. One or more communication buses 254, optionally, include circuitry (sometimes called a chipset) that interconnects and controls communications between system components. Computer system 110 is operatively coupled with data storage system 100 by one or more communication buses 254. In some embodiments, computer system 110 also includes a user interface 260. User interface 260 includes one or more output devices 262 that enable presentation of media content, including one or more speakers and/or one or more visual displays. User interface 260 also includes one or more input devices 264, including user interface components that facilitate user input such as a keyboard, a mouse, a voice-command input unit or microphone, a touch screen display, a touch-sensitive input pad, a gesture capturing camera, or other input buttons or controls. Memory 256 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 256, optionally, includes one or more storage devices remotely located from one or more CPUs 252. Memory 256, or alternatively the non-volatile memory device(s) within memory 256, comprises a non-transitory computer readable storage medium. In some embodiments, memory 256, or the non-transitory computer readable storage medium of memory 256, stores the following programs, modules, and data structures, or a subset or superset thereof:

- operating system 266 including procedures for handling various basic system services and for performing hardware dependent tasks;
- network communication module 268 for connecting computer system 100 to data storage system 110 connected to one or more networks via one or more network interfaces 258 (wired or wireless);
- presentation module 270 for enabling presentation of information (e.g., a user interface for a web page or an application program, audio and/or video content, text, etc.) at computer system 110 via one or more output devices 262 (e.g., displays, speakers, etc.) associated with user interface 260;
- input processing module 272 for detecting one or more user inputs or interactions from one of the one or more input devices 614 and interpreting the detected input or interaction;
- memory command module 274 for issuing memory commands (e.g., read, write, and erase commands) to storage controller 120; and
- management module 276 for persisting data, including but not limited to:
  - log entry module 278 for generating a log entry associated with respective write data;
  - allocation module 280 for allocating a portion (e.g., a set of logical addresses) of storage medium 130 (e.g., a persistent data store including non-volatile memory such as flash memory) for a record;
  - reference generation module 282 for generating a reference identifier for a record;
  - record management module 284 for generating a record by populating a plurality of fields of the record with previously generated values and obtained data including, for example, metadata, log entry, reference identifier for the record, forward reference identifier for a next record, forward reference address associated with the portion of storage medium 130 allocated for the next record, and write data, where the previously generated values and obtained data are (temporarily) stored in record buffer 286;
  - log stream management module 288 for batching a plurality of log entries (temporarily) stored in log stream buffer 290 into a log entry collection and writing a log stream portion to log stream 134 in storage medium 130, the log stream portion including the log entry collection and a reference pair (e.g., including a forward reference identifier and a forward reference addresses associated with a next record);
  - recovery module 292 for performing a recovery process, or causing a recovery process to be performed, in response to detecting an error condition or synchronization command;
  - deletion module 294 for deleting a record from storage medium 130;
  - logical to physical mapping 296 associating logical addresses with physical addresses for respective portions of storage medium 130; and
  - one or more database tables 298 (e.g., a set of indices or directories) for locating data (e.g., records 132) stored in storage medium 130 (e.g., the persistent data store).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 256 stores a subset of the modules and data structures identified above. Furthermore, memory 256 may store additional modules and data structures not described above. In some embodiments, the programs, modules, and data structures stored in memory 256, or the non-transitory computer readable storage medium of memory 256, provide instructions for implementing any of the methods described below with reference to FIGS. 8A-8C.

Although FIGS. 2A-2B shows a management module 121 and computer system 110, respectively, FIGS. 2A-2B are intended more as functional descriptions of the various features which may be present in a management module and computer system, respectively, than as a structural schematic of the embodiments described herein. In practice, and as recognized by those of ordinary skill in the art, the programs, modules, and data structures shown separately could be combined and some programs, modules, and data structures could be separated.

Figure 3:
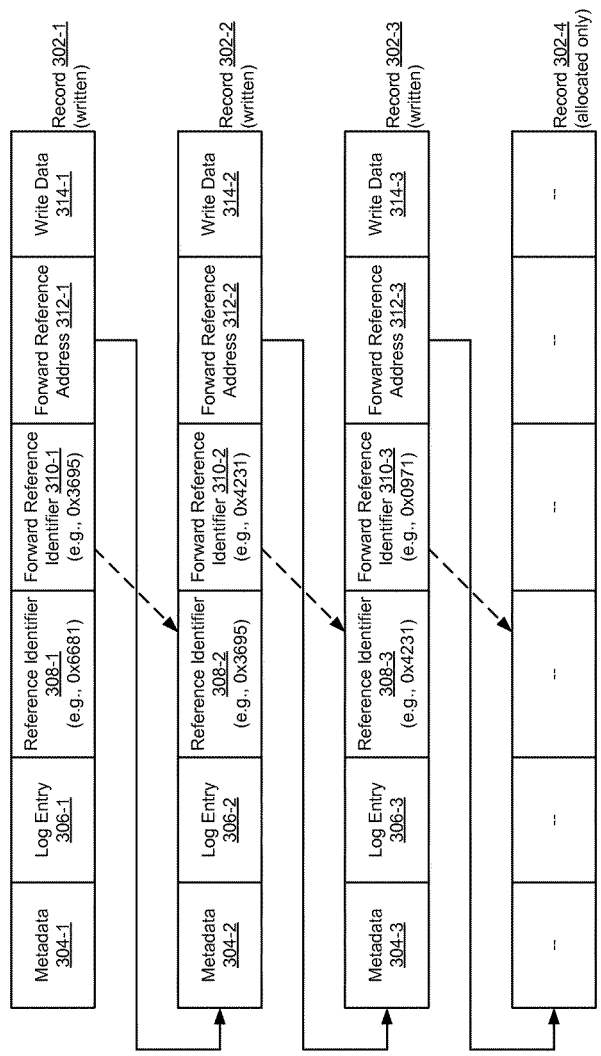
FIG. 3 illustrates block diagrams of a plurality of related data structures in accordance with some embodiments.

FIG. 3 illustrates block diagrams of a plurality of related data structures (e.g., records 302) in accordance with some embodiments. FIG. 3 includes records 302-1, 302-2, 302-3, and 302-4. In FIG. 3, a logical address or set of logical addresses in a persistent datastore (e.g., storage medium 130 including non-volatile memory such as flash memory) has been allocated for each of records 302-1, 302-2, 302-3, and 302-4; however, only records 302-1, 302-2, and 302-3 have been written to the persistent datastore.

Each of records 302-1, 302-2, and 302-3 include metadata 304, a log entry 306, a reference identifier 308, a forward reference identifier 310, a forward reference address 312, and write data 314. Record 302-3, for example, includes metadata 304-3, log entry 306-3, reference identifier 308-3, forward reference identifier 310-3, forward reference address 312-3, and write data 314-3.

In some embodiments, representative metadata 304-1 includes information related to write data 314-1. For example, metadata 304-1 includes information corresponding to the provider of write data 314-1, such as a unique identifier associated with the party providing, or author of, write data 314-1. In another example, metadata 304-1 includes information related to write data 314-1 such as a timestamp indicating the time of the write operation of record 302-1, encoding and encryption information, redundancy information, and/or other such information.

In some embodiments, representative log entry 306-1 includes information sufficient to replay the transaction (e.g., a write operation) associated with write data 314-1 in response to detection of an error condition (e.g., power failure, uncorrectable bit error rate, etc.) or a synchronization command. As such, log entries enable an electronic system or device (e.g., computer system 110, FIG. 1 or storage controller 120, FIG. 1) to replay transactions to the persistent datastore that were performed after a most recent snapshot. For example, log entry 306-1 includes the logical address allocated for write data 314-1, or alternatively, the logical address of record 302-1. In this example, the information included in log entry 306-1 enables the electronic system or device to determine where write data 314-1 fits into the persistent datastore (e.g., the logical address or set of logical addresses allocated for the write data).

In some embodiments, representative reference identifier 308-1 is a unique identifier for record 302-1. For example, reference identifier 308-1 is a randomly generated N bit number. In another example, reference identifier 308-1 includes an N/2 bit number which contains the time in seconds of the write operation of the corresponding record 302 in the upper N/2 bits and a randomly generated N/2 bit number in the lower N/2 bits of reference identifier 308-1. In FIG. 3, reference identifier 308-1 for record 302-1 is 0x6681.

In some embodiments, representative forward reference identifier 310-1 includes the reference identifier of the next record. In FIG. 3, forward reference identifier 310-1 for record 302-1 is 0x3695 which corresponds to reference identifier 308-2 for record 302-2.

In some embodiments, representative forward reference address 312-1 includes a pointer to the logical address or set of logical addresses allocated to the next record. For example, forward reference address 312-1 in record 302-1 indicates the first logical address allocated for record 302-2 (i.e., the next record).

In some embodiments, representative write data 314-1 is provided by the host (e.g., computer system 110).

In some embodiments, each of records 302 has a predefined size or one of a plurality of predefined sizes (e.g., 4 kB, 64 kB, 1 MB, 16 MB, etc.). In some embodiments, each of records 302 have differing sizes depending on the size of corresponding write data 314.

Figure 4:
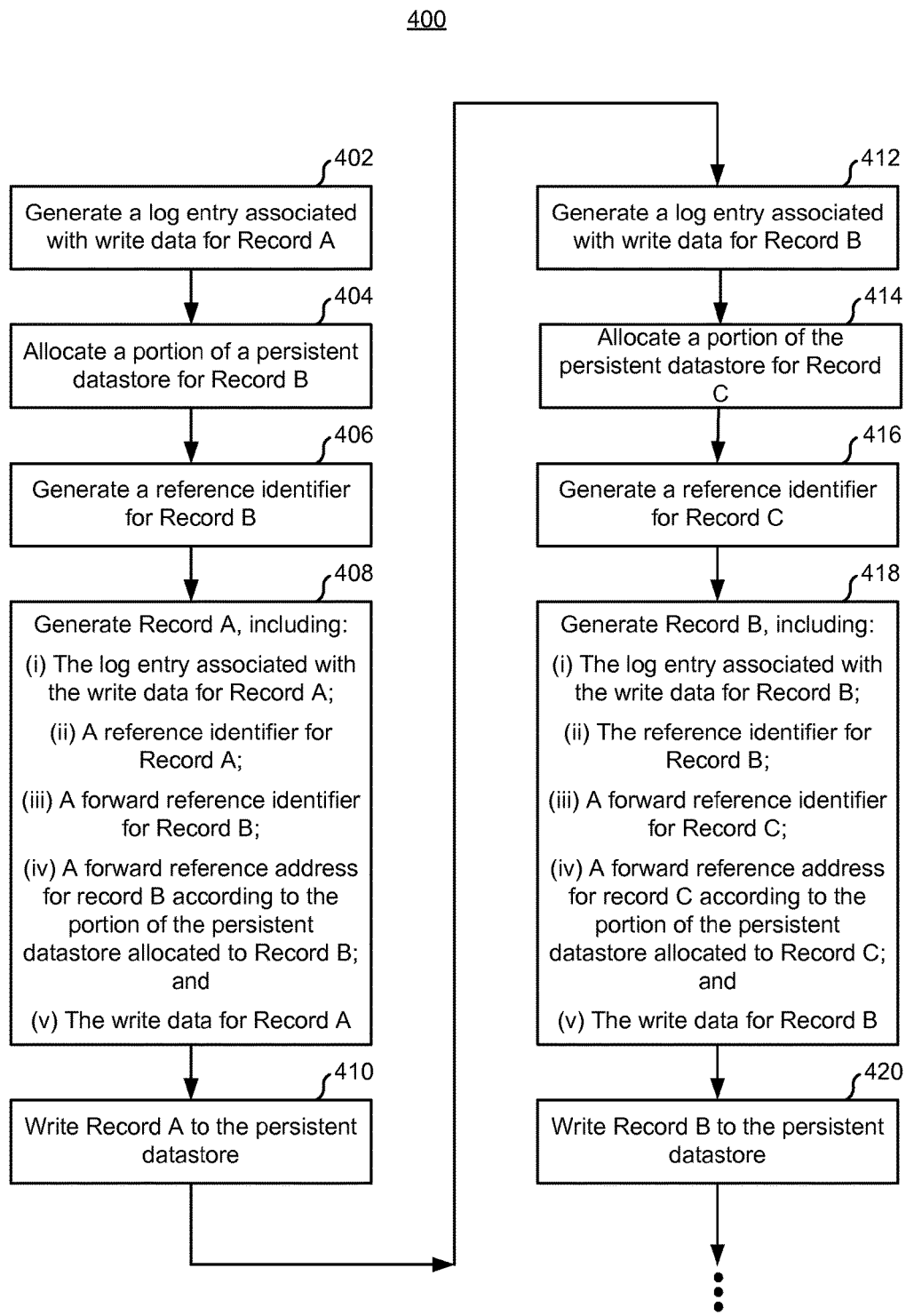
FIG. 4 illustrate a flowchart representation of a method of generating the data structures in FIG. 3 in accordance with some embodiments.

FIG. 4 illustrates a flowchart representation of a method 400 of generating the data structures (e.g., records 302) in FIG. 3 in accordance with some embodiments. In some embodiments, method 400 is performed by an electronic system or device with one or more processors and memory that is operatively coupled with a persistent datastore (e.g., storage medium 130 including non-volatile memory (NVM) such as flash memory). For example, method 400 is performed by storage controller 120 or one or more components thereof (e.g., management module 121, FIGS. 1 and 2A). In another example, method 400 is performed by computer system 110 or one or more components thereof (e.g., management module 276, FIG. 2B). In some embodiments, method 400 is governed by instructions that are stored in a non-transitory computer readable storage medium and the instructions are executed by one or more processors of the electronic system or device. For example, the aforementioned one or more processors are one or more processing units (CPUs) 122 of management module 121, or one or more processing units (CPUs) 252 of computer system 110.

The electronic system or device generates (402) a log entry associated with write data for record A (e.g., record 302-1 in FIG. 3). In some embodiments, the log entry includes information sufficient to replay the transaction (e.g., a write operation) associated with write data for record A.

The electronic system or device allocates (404) a portion of the persistent datastore for a next record, herein called record B. In some embodiments, a set of logical addresses are allocated for record B and logical to physical mapping 230 is updated to include the allocated set of logical addresses.

The electronic system or device generates (406) a reference identifier for record B. In FIG. 3, for example, reference identifier 308-2 for record 302-2 is 0x3695. In some embodiments, a reference identifier is a unique number that identifies a record. In some embodiments, reference identifiers are monotonically increasing and are randomly generated.

The electronic system or device generates (408) record A. In some embodiments, generating record A includes populating a plurality of fields of record A with previously generated values and obtained data stored in record buffer 220. In some embodiments, record A includes: (i) the log entry generated in step 402 for record A; (ii) a reference identifier for record A (e.g., previously generated); (iii) a forward reference identifier for record B (e.g., 0x3695) that matches the reference identifier generated for record B in step 406; (iv) a forward reference address for record B that corresponds to the set of logical addresses, or the first logical address in the set of logical addresses, allocated for record B in step 404; and (v) write data for record A (e.g., obtained from the host). However, in some embodiments, record A includes a subset of these fields, and optionally includes additional fields.

The electronic system or device performs a single write operation to write (410) record A to the persistent datastore. For example, data write module 208 writes record A to a set logical addresses allocated for record A. In some embodiments, although record A is written to a contiguous set of logical addresses, record A is striped across one or more physical portions of the persistent datastore (e.g., one or more flash memory devices, one or more flash memory blocks, or the like).

Next, the electronic system or device generates (412) a log entry associated with write data for record B (e.g., record 302-2 in FIG. 3).

The electronic system or device allocates (414) a portion of the persistent datastore for a next record, herein called record C. In some embodiments, a set of logical addresses are allocated for record C and logical to physical mapping 230 is updated to include the allocated set of logical addresses.

The electronic system or device generates (416) a reference identifier for record C. In FIG. 3, for example, reference identifier 308-3 for record 302-3 is 0x4231.

The electronic system or device generates (418) record B. In some embodiments, record B includes: (i) the log entry generated for record B in step 412; (ii) the reference identifier generated for record B in step 406; (iii) a forward reference identifier for record C (e.g., 0x4231) that matches the reference identifier generated for record C in step 416; (iv) a forward reference address for record C that corresponds to the set of logical addresses, or the first logical address in the set of logical addresses, allocated for record C in step 414; and (v) write data for record B. However, in some embodiments, record B includes a subset of these fields, and optionally includes additional fields.

The electronic system or device performs a single write operation to write (420) record B to the persistent datastore. For example, data write module 208 writes record B to the set logical addresses allocated for record B in step 404.

The electronic system or device continues to write records to the persistent store, as described above, and prior to writing each such record, to allocate a portion of the persistent datastore for a next record, so that each record written to the persistent data store includes a forward reference address and forward reference identifier of the next record relative to the record being written, as well as a log entry and write data. Further, each such record is written with a single write operation, as described above.

Figure 5:
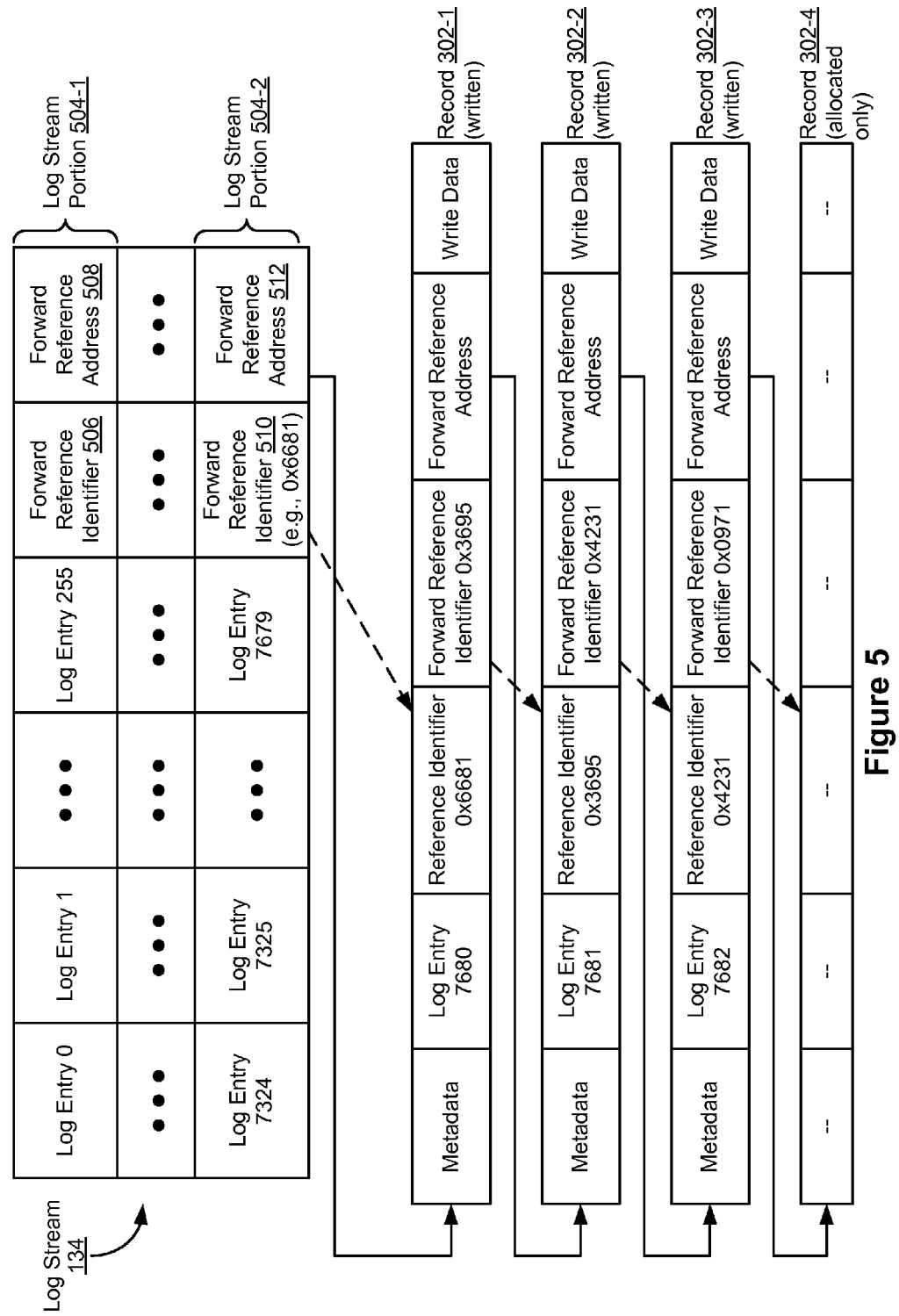
FIG. 5 illustrates a block diagram of a log stream in accordance with some embodiments.

FIG. 5 illustrates a block diagram of a log stream 134 in accordance with some embodiments. Log stream 134 is stored in a persistent datastore (e.g., storage medium 130 comprising non-volatile memory such as flash memory), and log stream 134 comprises a plurality of log stream portions including log stream portions 504-1 and 504-2.

In some embodiments, each of the plurality of log entries in log stream 134 includes information sufficient to replay a transaction (e.g., a write operation) associated with corresponding write data. In some embodiments, a respective log stream portion 504 of log stream 134 corresponds to a log entry collection (e.g., 256 log entries). In FIG. 5, log stream portion 504-1 corresponds to a log entry collection including log entries 0 through 255, and log stream portion 504-2 corresponds to a log entry collection including log entries 7324 through 7679.

In some embodiments, an electronic system or device (e.g., computer system 110, FIG. 1 or storage controller 120, FIG. 1) or a component thereof (e.g., log stream management module 222, FIG. 2A or log stream management module 288, FIG. 2B) is configured to batch a plurality of log entries into a log entry collection and write a log stream portion to a log stream in the persistent datastore. The log stream portion includes the log entry collection and a reference pair. In some embodiments, the last log entry in the log entry collection is included in a record which also includes the reference pair. In some embodiments, the reference pair includes a forward reference identifier and a forward reference address corresponding to a next allocated record whose corresponding log entry has not been written to the log stream.

In FIG. 5, log stream portion 504-1 includes log entries 0 through 255 (e.g., the log entry collection) and, also, forward reference identifier 506 and forward reference address 508 (e.g., the reference pair). Forward reference identifier 506 and forward reference address 508 are also included in the record corresponding to log entry 255. In FIG. 5, log stream portion 504-2 includes log entries 7324 through 7679 (e.g., the log entry collection) and, also, forward reference identifier 510 and forward reference address 512 (e.g., the reference pair corresponding to record 302-1). Forward reference identifier 510 and forward reference address 512 are included in the record corresponding to log entry 7679. For example, log stream portion 504-1 is a first portion of log stream 134 and log stream portion 504-2 is a newest (or most recently written) portion of log stream 134.

For example, the electronic system or device or a component thereof (e.g., log stream management module 222, FIG. 2A or log stream management module 288, FIG. 2B) caches in a buffer (e.g., log stream buffer 224, FIG. 2A or log stream buffer 290, FIG. 2B) log entry 0 associated with record 0 and the forward reference identifier and forward reference address included in record 0. Then, in this example, the electronic system or device or a component thereof (e.g., log stream management module 222, FIG. 2A or log stream management module 288, FIG. 2B) caches in the buffer log entry 1 associated with record 1 and replaces the forward reference identifier and forward reference address included in record 0 with the forward reference identifier and forward reference address included in record 1. Continuing with this example, the electronic system or device or a component thereof (e.g., log stream management module 222, FIG. 2A or log stream management module 288, FIG. 2B) continues caching log entries and replacing the cached forward reference identifier and forward reference address with the forward reference identifier and forward reference address in the record associated with the newest cached log entry until a predetermined count of log entries (e.g., 256 log entries) are cached in the buffer. In some alternative embodiments, the electronic system or device or a component thereof caches log entries, without writing forward reference identifiers and forward reference addresses to the log stream buffer until a predetermined count of log entries (e.g., 256 log entries) are cached in the buffer, at which point it stores in the log stream buffer the forward reference identifier and forward reference address in the record associated with the newest cached log entry.

In some embodiments, after the electronic system or device or a component thereof (e.g., log stream management module 222, FIG. 2A or log stream management module 288, FIG. 2B) has cached the predetermined count of log entries, the electronic system or device or a component thereof (e.g., data write module 208, FIG. 2A or memory command module 274, FIG. 2B) writes the contents of the buffer (e.g., the log stream portion), or causes the contents to be written, to log stream 134 in the persistent datastore and the buffer is flushed.

In some embodiments, in response to detecting an error condition, the electronic system or device or a component thereof (e.g., recovery module 226, FIG. 2A or recovery module 292, FIG. 2B) is configured to perform a recovery process to recover the persistent datastore. In some embodiments, in response to a synchronization command, the electronic system or device or a component thereof (e.g., recovery module 226, FIG. 2A or recovery module 292, FIG. 2B) is configured to perform a recovery process to synchronize a target persistent datastore with a reference persistent datastore.

In some embodiments, the recovery process includes reading the log entries from log stream 134 with a single read operation or a series of contiguous read operations. In this example, after the log entries from log stream 134 have been read, the electronic system or device or a component thereof (e.g., recovery module 226, FIG. 2A or recovery module 292, FIG. 2B) is configured to utilize the log entries to replay the transactions associated with each of the log entries. Therefore, log stream 134 enables the electronic system or device to perform a recovery process with a minimum number of read operations.

In some embodiments, the recovery process also includes following a pointer (e.g., forward reference address 512) included in the newest log stream portion (e.g., log stream portion 504-2) to a first record (e.g., record 302-1) whose log entry has not been written to the log stream. In FIG. 5, forward reference address 512 in log stream portion 504-2 includes a first logical address in the set of logical addresses allocated for record 302-1.

In some embodiments, the recovery process further includes determining whether a forward reference identifier included in the newest log stream portion matches the reference identifier of the first record. In FIG. 5, forward reference identifier 510 (e.g., 0x6681) matches the reference identifier (e.g., 0x6681) included in record 302-1. In accordance with the determination that forward reference identifier 510 matches record 302-1 reference identifier, the recovery process further includes utilizing log entry 7680 associated with record 302-1 to replay the transaction associated with record 302-1's write data.

In some embodiments, the recovery process further includes following the forward reference address in the first record (e.g., record 302-1) to a second record (e.g., record 302-2), determining whether the forward reference identifier in the first record matches the reference identifier in the second record, and, in accordance with a determination that there is a match, replaying the transaction associated with the second record's write data. This process is repeated until the forward reference identifier included in a record (e.g., record 302-3) fails to match the reference identifier in a next record (e.g., record 302-4).

When a match cannot be determined, the electronic system or device or a component thereof (e.g., recovery module 226, FIG. 2A or recovery module 292, FIG. 2B) is configured to stop the recovery process. The match failure indicates that the next record (e.g., record 302-4) has been allocated but not written. Thus, the electronic system or device has completed replaying all transactions that occurred (e.g., all transactions that were successfully committed to a persistent datastore) prior to the detection of the error condition or synchronization command.

In another example, different from what is shown in FIG. 5, forward reference address 512 in log stream portion 504-2 points to a next record that is allocated but not written to persistent storage. Thus, forward reference identifier 510 in log stream portion 504-2 does not match the reference identifier associated with the next record that is allocated but not written indicating that the recovery process is complete.

Figure 6:
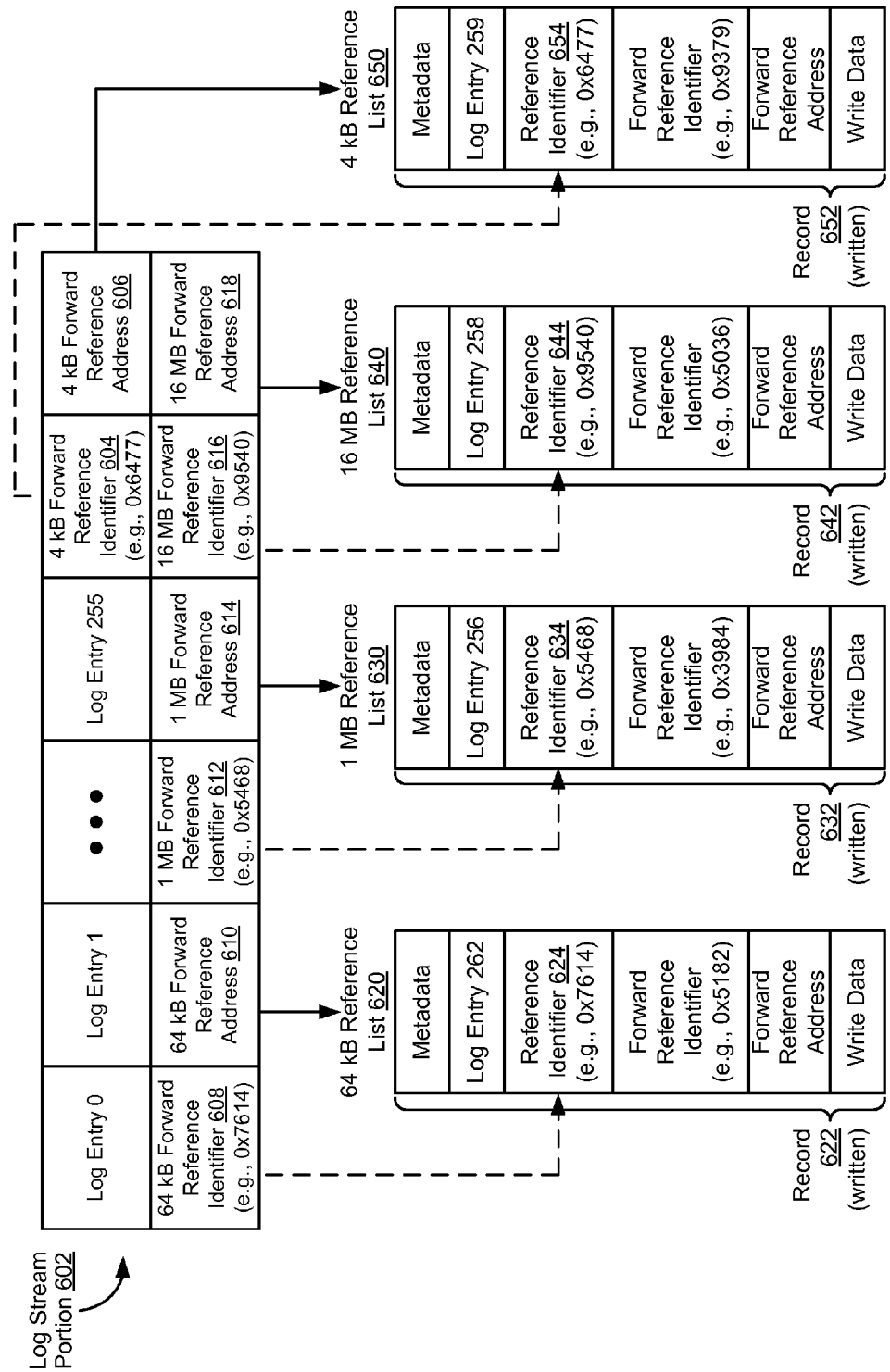
FIG. 6 illustrates a block diagram of a portion of a log stream in accordance with some embodiments.

FIG. 6 illustrates a block diagram of a log stream portion 602 in accordance with some embodiments. In FIG. 6, log stream portion 602 is a representative portion of log stream 134 (FIG. 1) in the persistent datastore (e.g., storage medium 130 comprising non-volatile memory such as flash memory).

Log stream portion 602 includes log entries 0 through 255 and a plurality of reference pairs. Each reference pair of log stream portion 602 includes a pointer (e.g., a forward reference address) to a first logical address of a next allocated record in a reference list (or set of records) associated with one of a plurality of predetermined record sizes. In some embodiments, in the last log stream portion 602 in log stream 134, a reference pair includes a forward reference identifier and a forward reference address corresponding to a next allocated record whose corresponding log entry has not been written to log stream 134.

In FIG. 6, forward reference identifier 604 and forward reference address 606 correspond to record 652. In FIG. 6, forward reference identifier 604 (e.g., 0x6477) in log stream portion 602 matches reference identifier 654 (e.g., 0x6477) in record 652. Forward reference address 606 corresponds to a set of logical addresses, or a first logical address in the set of logical addresses, allocated for record 652. Record 652 is the first 4 kB record in 4 kB reference list 650. 4 kB reference list 650 links records having a record size of 4 kB.

In FIG. 6, forward reference identifier 608 and forward reference address 610 correspond to record 622. In FIG. 6, forward reference identifier 608 (e.g., 0x7614) in log stream portion 602 matches reference identifier 624 (e.g., 0x7614) in record 622. Forward reference address 610 corresponds to a set of logical addresses, or a first logical address in the set of logical addresses, allocated for record 622. Record 622 is the first 64 kB record in 64 kB reference list 620. 64 kB reference list 620 links records having a record size of 64 kB.

In FIG. 6, forward reference identifier 612 and forward reference address 614 correspond to record 632. In FIG. 6, forward reference identifier 612 (e.g., 0x5468) in log stream portion 602 matches reference identifier 634 (e.g., 0x5468) in record 632. Forward reference address 614 corresponds to a set of logical addresses, or a first logical address in the set of logical addresses, allocated for record 632. Record 632 is the first 1 MB record in 1 MB reference list 630. 1 MB reference list 630 links records having a record size of 1 MB. In FIG. 6, log entry 256 is included in record 632; thus, record 632 was written to the persistent datastore after the record corresponding to log entry 255.

In FIG. 6, forward reference identifier 616 and forward reference address 618 correspond to record 642. In FIG. 6, forward reference identifier 616 (e.g., 0x9540) in log stream portion 602 matches reference identifier 644 (e.g., 0x9540) in record 642. Forward reference address 618 corresponds to a set of logical addresses, or a first logical address in the set of logical addresses, allocated for record 642. Record 642 is the first 16 MB record in 16 MB reference list 640. 16 MB reference list 640 links records having a record size of 16 MB.

FIG. 7 illustrates block diagrams of related data structures (e.g., records 702 and 710) in accordance with some embodiments.

In FIG. 7, record 702 is stored in a persistent datastore (e.g., storage medium 130 including non-volatile memory such as flash memory) and includes write data 704. In response to a command to delete write data 704, an electronic system or device (e.g., computer system 110, FIG. 1 or storage controller 120, FIG. 1) or a component thereof (e.g., deletion module 228, FIG. 2A or deletion module 294, FIG. 2B) is configured to generate record 710, including log entry 712 indicating that record 710 represents a deletion of record 702 and tombstone 714 corresponding to write data 704. Then, the electronic system or device or a component thereof (e.g., data write module 208, FIG. 2A or memory command module 274, FIG. 2B) is configured to write record 710 to the persistent datastore with a single write operation. In some embodiments, record 710 is written to the set of logical addresses allocated for record 702.

Figure 8A:
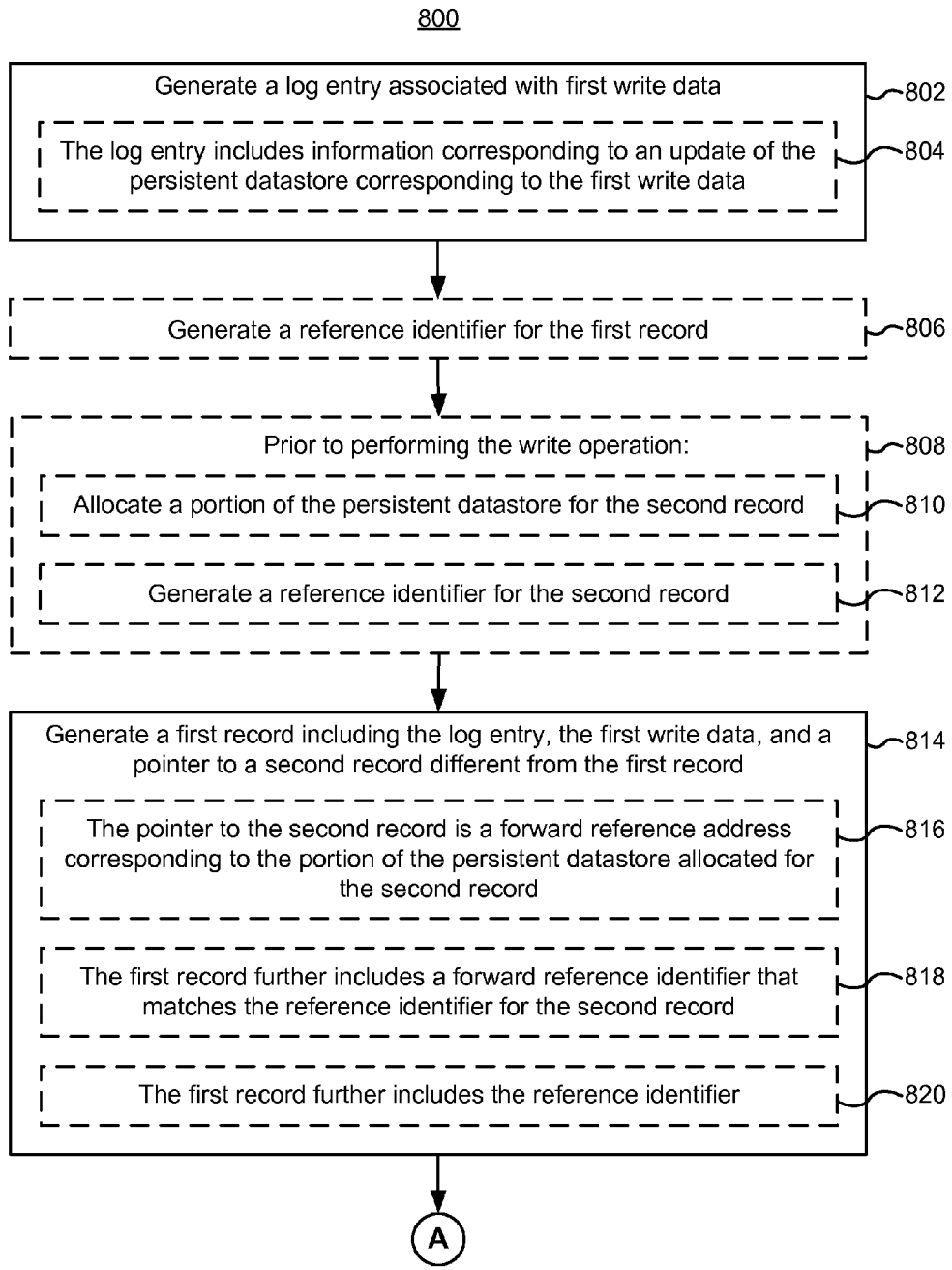
FIGS. 8A-8C illustrate a flowchart representation of a method of persisting data in accordance with some embodiments.
Figure 8B:
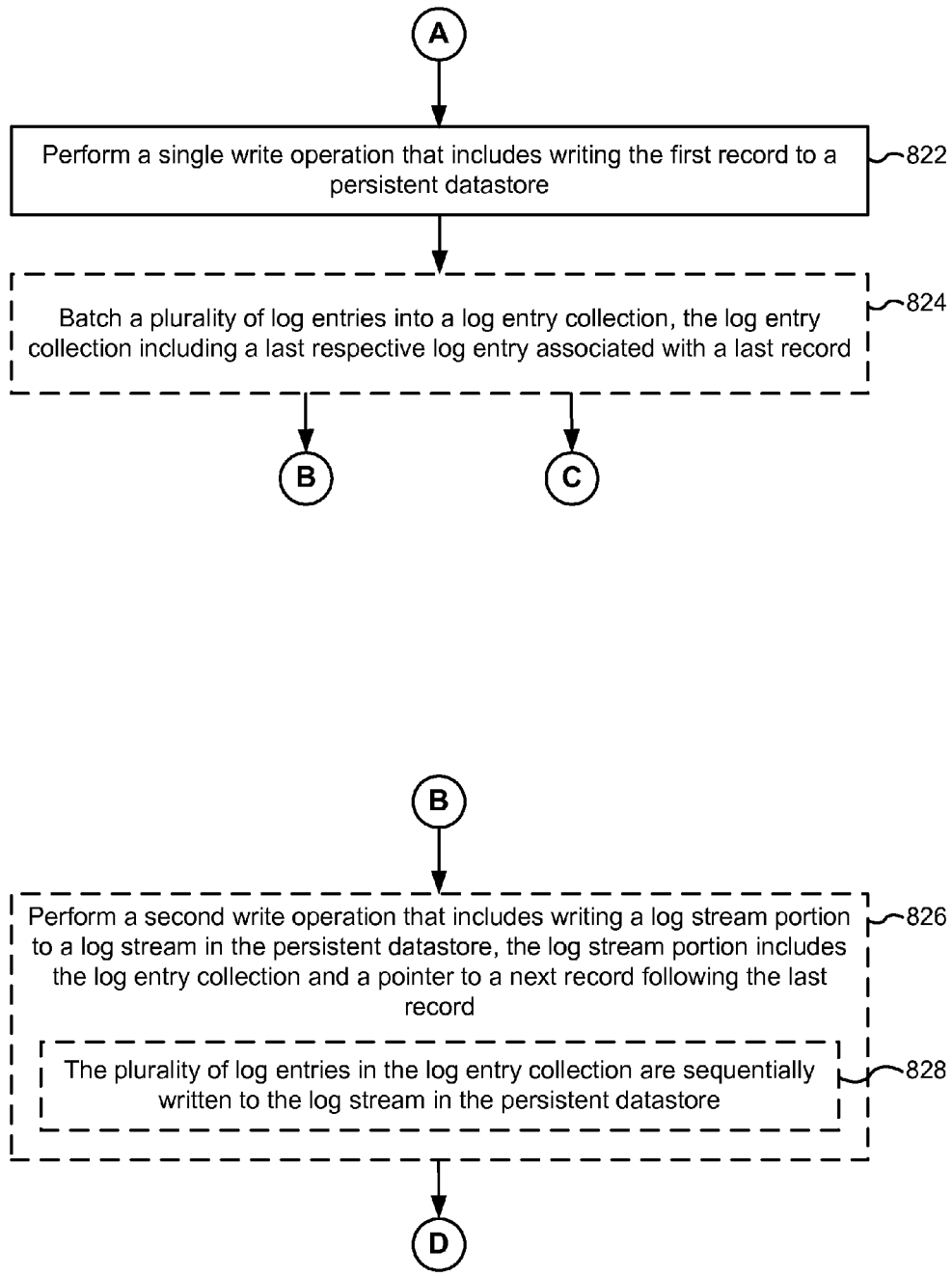
Figure 8C:
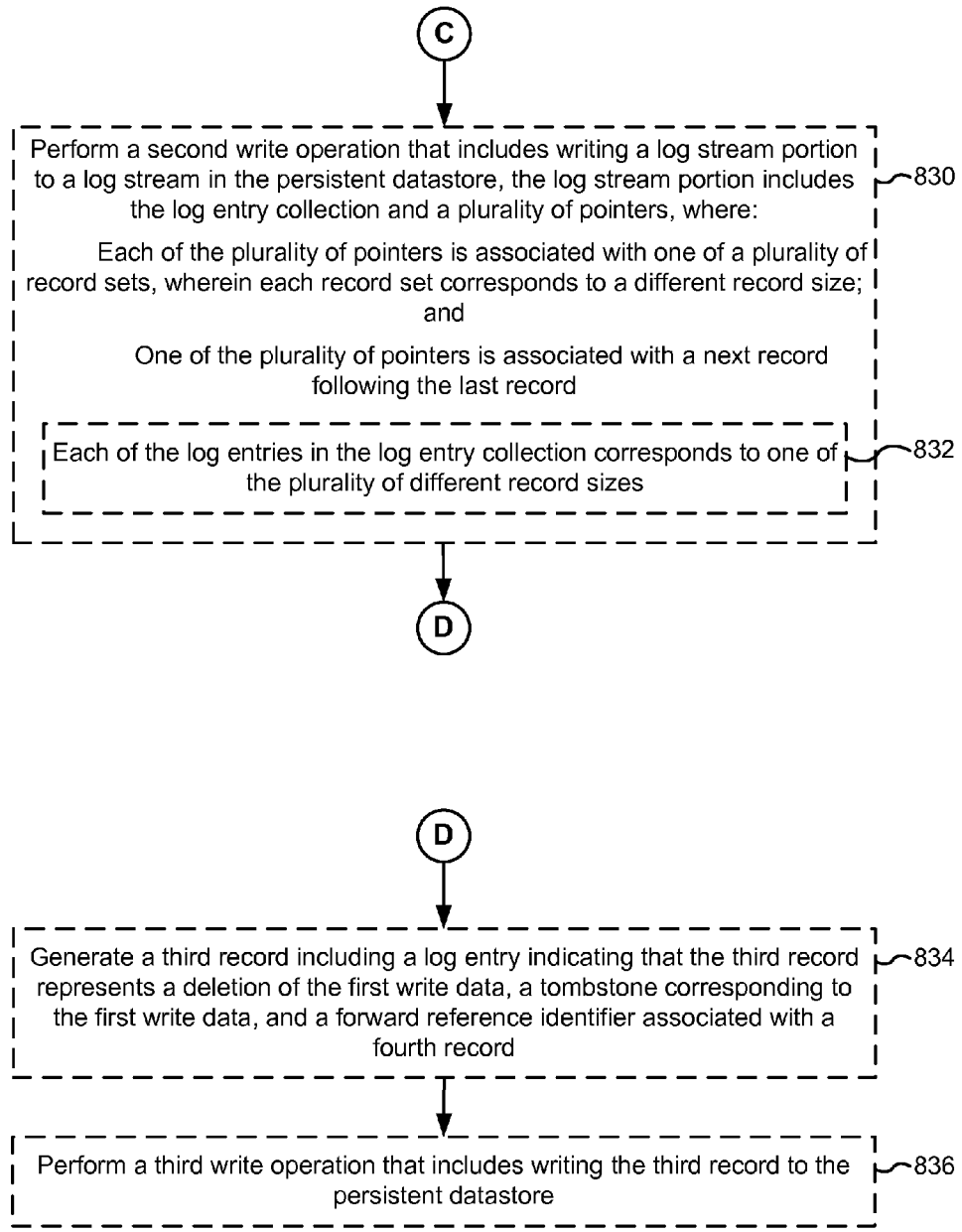

FIGS. 8A-8C illustrate a flowchart representation of a method 800 of persisting data in accordance with some embodiments. In some embodiments, method 800 is performed by an electronic system or device with one or more processors and memory that is operatively coupled with a persistent datastore (e.g., storage medium 130 including non-volatile memory such as flash memory). For example, method 800 is performed by storage controller 120 or one or more components thereof (e.g., management module 121, FIGS. 1 and 2A). In another example, method 800 is performed by computer system 110 or one or more components thereof (e.g., management module 276, FIG. 2B). In some embodiments, method 800 is governed by instructions that are stored in a non-transitory computer readable storage medium and the instructions are executed by one or more processors of the electronic system or device.

The electronic system or device generates (802) a log entry associated with first write data corresponding to a first record. With reference to FIG. 3, for example, the electronic system or device or a component thereof (e.g., log entry module 212, FIG. 2A or log entry module 278, FIG. 2B) generates log entry 306-1 for record 302-1 based on write data 314-1. In some embodiments, log entry 306-1 is subsequently cached in a buffer (e.g., record buffer 220, FIG. 2A or record buffer 286, FIG. 2B) prior to generation of record 302-1.

In some embodiments, the log entry includes (804) information corresponding to an update (e.g., a transaction or memory operation) of the persistent datastore corresponding to the first write data.

In some embodiments, the electronic system or device generates (806) a reference identifier for the first record. With reference to FIG. 3, for example, the electronic system or device or a component thereof (e.g., reference generation module 216, FIG. 2A or reference generation module 282, FIG. 2B) generates reference identifier 308-1 (e.g., 0x6681) for record 302-1. In some embodiments, reference identifier 308-1 is subsequently cached in a buffer (e.g., record buffer 220, FIG. 2A or record buffer 286, FIG. 2B) prior to generation of record 302-1.

In some embodiments, prior to performing (808) a write operation corresponding to the first record, the electronic system or device allocates (810) a portion of the persistent datastore for the second record. With reference to FIG. 3, for example, the electronic system or device or a component thereof (e.g., allocation module 214, FIG. 2A or allocation module 280, FIG. 2B) allocates a logical address or set of logical addresses in the persistent datastore for record 302-2 before writing record 302-1 to the persistent datastore. In some embodiments, the first logical address allocated for record 302-2 is subsequently cached in a buffer (e.g., record buffer 220, FIG. 2A or record buffer 286, FIG. 2B), as a forward reference address, prior to generation of record 302-1.

In some embodiments, prior to performing (808) a write operation corresponding to the first record, the electronic system or device generates (812) a reference identifier for the second record, where a forward reference identifier associated with the first record matches the reference identifier for the second record. With reference to FIG. 3, for example, the electronic system or device or a component thereof (e.g., reference generation module 216, FIG. 2A or reference generation module 282, FIG. 2B) generates reference identifier 308-2 for record 302-2 before writing record 302-1 to the persistent datastore. In FIG. 3, for example, forward reference identifier 310-1 in record 302-1 matches reference identifier 308-2 for record 302-2 (e.g., 0x3695). In some embodiments, reference identifier 308-2 is subsequently cached in a buffer (e.g., record buffer 220, FIG. 2A or record buffer 286, FIG. 2B) prior to generation of record 302-1.

The electronic system or device generates (814) the first record including the log entry, the first write data, and a pointer to the second record different from the first record. With reference to FIG. 3, for example, the electronic system or device or a component thereof (e.g., record management module 218, FIG. 2A or record management module 284, FIG. 2B) generates record 302-2 by populating a plurality of fields of record 302-2 with previously generated values and obtained data cached in an associated buffer (e.g., record buffer 220, FIG. 2A or record buffer 286, FIG. 2B). For example, for record 302-2, a log entry field is populated with log entry 306-2 associated with write data 314-2, a write data field is populated with write data 314-2 received from a host (e.g., computer system 110, FIG. 1), and a pointer field (e.g., forward reference address 312-2) is populated with the set of logical addresses, or a first logical address in the set of logical addresses, allocated for record 302-3.

In some embodiments, the pointer to the second record is (816) a forward reference address corresponding to the portion of the persistent datastore allocated for the second record. In FIG. 3, for example, a forward reference address field of record 302-1 is populated with forward reference address 312-1 that includes the first logical address in the set of logical addresses allocated for record 302-2 in the persistent datastore. Thus, in this example, forward reference address 312-1 points to record 302-2. For example, the set of logical addresses allocated for record 302-2 are cached in a buffer (e.g., record buffer 220, FIG. 2A or record buffer 286, FIG. 2B).

In some embodiments, the first record further includes (818) a forward reference identifier that matches the reference identifier for the second record. With reference to FIG. 3, for example, a forward reference identifier field of record 302-1 is populated with forward reference identifier 310-1 (e.g., 0x3695) that matches reference identifier 308-2 (e.g., 0x3695) in record 302-2. For example, reference identifier 308-2 is cached in a buffer (e.g., record buffer 220, FIG. 2A or record buffer 286, FIG. 2B).

In some embodiments, the first record further includes (820) the reference identifier for the first record. With reference to FIG. 3, for example, a reference identifier field of record 302-1 is populated with reference identifier 308-1 (e.g., 0x6681). For example, reference identifier 308-1 is cached in a buffer (e.g., record buffer 220, FIG. 2A or record buffer 286, FIG. 2B).

The electronic system or device performs (822) a single write operation that includes writing the first record to the persistent datastore. With reference to FIG. 3, for example, record 302-2 is written to a logical address or a contiguous set of logical addresses in the persistent datastore. In some embodiments, from the perspective of the host (e.g., computer system 110), "writing the first record" means sending a single write command to storage controller 120 to write the first record to the persistent datastore (i.e., causing the write operation to be performed).

In some embodiments, the electronic system or device batches (824) a plurality of log entries into a log entry collection, the log entry collection including a last respective log entry associated with a last record. In some embodiments, the log entries are cached in a buffer (e.g., log stream buffer 224, FIG. 2A or log stream buffer 290, FIG. 2B). With reference to FIG. 5, for example, after a predetermined count of log entries (e.g., 256 log entries) have been cached, the electronic system or device or a component thereof (e.g., log stream management module 222, FIG. 2A or log stream management module 288, FIG. 2B) batches the log entries cached in the buffer into a log entry collection. In FIG. 5, for example, a log entry collection in log stream portion 504-2 includes log entries 7324 through 7679. In FIG. 5, for example, log entry 7679 is the last log entry of the log entry collection in log stream portion 504-2.

In some embodiments, after performing the batching, the electronic system or device performs (826) a second write operation that includes writing a log stream portion to a log stream in the persistent datastore, the log stream portion includes the log entry collection and a pointer to a next record following the last record. With reference to FIG. 5, for example, after batching the log entries into the log entry collection, the electronic system or device or a component thereof (e.g., data write module 208, FIG. 2A or memory command module 274, FIG. 2B) writes log stream portion 504-2 to log stream 134 in the persistent datastore. In FIG. 5, for example, log stream portion 504-2 includes log entries 7324 through 7679 (e.g., the log entry collection) and, also, forward reference identifier 510 and forward reference address 512 (e.g., the pointer to the next record following the record associated with log entry 7679). In FIG. 5, forward reference address 512 in log stream portion 504-2 includes a first logical address in the set of logical addresses allocated for record 302-1.

In some embodiments, the plurality of log entries in the log entry collection are sequentially written (828) to the log stream in the persistent datastore. For example, the log entries in the log entry collection are arranged in the order in which their corresponding records were written to the persistent datastore. With reference to FIG. 5, for example, log entry 0 corresponds to a first record written to the persistent datastore and log entry 1 corresponds to a second record written to the persistent datastore. To preserve this order, the log entries are sequentially arranged in the log entry collection and sequentially written to log stream 134.

In some embodiments, after performing the batching, the electronic system or device performs (830) a second write operation that includes writing a log stream portion to a log stream in the persistent datastore, the log stream portion includes the log entry collection and a plurality of pointers, where: each of the plurality of pointers is associated with one of a plurality of record sets, where each record set corresponds to a different record size; and one of the plurality of pointers is associated with a next record following the last record. With reference to FIG. 6, for example, log stream portion 602 is written to log stream 134 in the persistent datastore. In FIG. 6, for example, log stream portion 602 includes log entries 0 through 255 and a plurality of reference pairs. In FIG. 6, for example, each reference pair includes a pointer (e.g., a forward reference addresses 606, 610, 614, 618) to a first logical address of a next allocated record in a reference list (or record set) (e.g., reference lists 620, 630, 640, 650) associated with one of a plurality of predetermined record sizes (e.g., 4 kB, 64 kB, 1 MB, 16 MB respectively). In FIG. 6, forward reference address 614 points to record 632 including log entry 256, which is the next log entry following log entry 255 in log stream portion 602.

In some embodiments, each of the log entries in the log entry collection corresponds to (832) one of the plurality of different record sizes. In FIG. 6, for example, each of log entries 0 through 255 comprising the log entry collection in log stream portion 602 is associated with one of a plurality of record sizes (e.g., 4 kB, 64 kB, 1 MB, 16 MB, and so on).

In some embodiments, the electronic system or device generates (834) a third record including a log entry indicating that the third record represents a deletion of the first write data, a tombstone corresponding to the first write data, and a forward reference identifier associated with a fourth record. With reference to FIG. 7, for example, the electronic system or device or a component thereof (e.g., deletion module 228, FIG. 2A or deletion module 294, FIG. 2B) generates record 710. In FIG. 7, for example, record 710 includes log entry 712 indicating that record 710 represents a deletion of record 702, tombstone 714 corresponding to write data 704 in record 702, and forward reference address 716 including a first logical address in a set of logical addresses allocated for a next record.

In some embodiments, after generating the third record, the electronic system or device performs (836) a third write operation that includes writing the third record to the persistent datastore. With reference to FIG. 7, for example, the electronic system or device or a component thereof (e.g., data write module 208, FIG. 2A or memory command module 274, FIG. 2B) writes record 710 to the persistent datastore.

It will be understood that, although the terms "first," "second," etc. may be used herein to describe various elements, these elements should not be limited by these terms. These terms are only used to distinguish one element from another. For example, a first record could be termed a second record, and, similarly, a record could be termed a first record, without changing the meaning of the description, so long as all occurrences of the "first record" are renamed consistently and all occurrences of the "second record" are renamed consistently. The first record and the second record are both records, but they are not the same record.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of recovering persisted data, comprising: at an electronic system with one or more processors and memory:
    generating a first log entry associated with first write data to be stored in a persistent data store, wherein the first log entry includes information sufficient to replay a transaction corresponding to the first write data;
    generating a forward reference identifier for a second record of a plurality of sequential records that is different from a first record of the plurality of sequential records, wherein each respective record of the plurality of sequential records includes a respective log entry, write data that was not yet stored in the persistent data store when said log entry was generated, a respective reference identifier for the respective record, a forward reference identifier for a next record in the sequence, and a pointer to a next record in the sequence;
    generating the first record including the first log entry, the first write data, the forward reference identifier for the second record, and a pointer to the second record;
    performing a single write operation that includes writing the first record to the persistent datastore, wherein:
        the pointer to the second record is a pointer to a location in the persistent data store allocated for writing the second record prior to writing the first record and the second record to the persistent datastore, and
        the forward reference identifier for the second record is different from the pointer to the second record; and
    performing a recovery operation that includes:
        reading the first log entry;
        using the pointer to the second record to read a second log entry;
        determining whether the forward reference identifier for the second record matches a second reference identifier in the second record;
        in accordance with a determination that the forward reference identifier for the second record matches the second reference identifier in the second record, replaying a transaction associated with the second log entry; and
        in accordance with a determination that the forward reference identifier for the second record does not match the second reference identifier in the second record, stopping the recovery operation.

2. The method of claim 1, wherein the first log entry includes a logical address of the first record or of the first write data.

3. The method of claim 1, further comprising:
    generating a reference identifier for the first record; and
    wherein the first record further includes the reference identifier for the first record.

4. The method of claim 1, wherein the first log entry includes information corresponding to an update of the persistent datastore corresponding to the first write data.

5. The method of claim 1, further comprising:
    batching a plurality of log entries into a log entry collection, the log entry collection including a last respective log entry associated with a last record; and
    performing a second write operation that includes writing a log stream portion to a log stream in the persistent datastore, the log stream portion includes the log entry collection and, separate from the log entry collection, a pointer to a next record following the last record.

6. The method of claim 5, wherein the plurality of log entries in the log entry collection are sequentially written to the log stream in the persistent datastore.

7. The method of claim 1, further comprising:
    batching a plurality of log entries into a log entry collection, the log entry collection including a last respective log entry associated with a last record; and
    performing a second write operation that includes writing a log stream portion to a log stream in the persistent datastore, the log stream portion includes the log entry collection and a plurality of pointers, wherein:
        each of the plurality of pointers is associated with one of a plurality of record sets, wherein at least one record set of the plurality of record sets has a different size from at least one other record set of the plurality of record sets; and
        one of the plurality of pointers is associated with a next record following the last record.

8. The method of claim 7, wherein each of the log entries in the log entry collection corresponds to one of the plurality of different record sizes.

9. The method of claim 1, further comprising:
    generating a third record including a log entry indicating that the third record represents a deletion of the first write data, a tombstone corresponding to the deleted first write data, and a forward reference identifier associated with a fourth record; and
    performing a third write operation that includes writing the third record to the persistent datastore.

10. An electronic system, comprising:
    one or more processors; and
    memory storing one or more programs to be executed by the one or more processors, the one or more programs comprising instructions for:
        generating a first log entry associated with first write data to be stored in a persistent data store, wherein the first log entry includes information sufficient to replay a transaction associated with the first write data;
        generating a forward reference identifier for a second record of a plurality of sequential records that is different from a first record of the plurality of sequential records, wherein each respective record of the plurality of sequential records includes a respective log entry, write data that was not yet stored in the persistent data store when said log entry was generated, a respective reference identifier for the respective record, a forward reference identifier for a next record in the sequence, and a pointer to a next record in the sequence;
        generating the first record including the first log entry, the first write data, the forward reference identifier for the second record, and a pointer to the second record;
        performing a single write operation that includes writing the first record to the persistent datastore, wherein:

the pointer to the second record is a pointer to a location in the persistent data store allocated for writing the second record prior to writing the first record and the second record to the persistent datastore, and the forward reference identifier for the second record is different from the pointer to the second record; and performing a recovery operation that includes:
reading the first log entry;
using the pointer to the second record to read a second log entry;
determining whether the forward reference identifier for the second record matches a second reference identifier in the second record;
in accordance with a determination that the forward reference identifier for the second record matches the second reference identifier in the second record, replaying a transaction associated with the second log entry; and
in accordance with a determination that the forward reference identifier for the second record does not match the second reference identifier in the second record, stopping the recovery operation.

11. The electronic system of claim 10, wherein the first log entry includes a logical address of the first record or of the first write data.

12. The electronic system of claim 10, wherein the one or more programs further comprise instructions for:
generating a reference identifier for the first record; and wherein the first record further includes the reference identifier for the first record.

13. The electronic system of claim 10, wherein the first log entry includes information corresponding to an update of the persistent datastore corresponding to the first write data.

14. The electronic system of claim 10, wherein the one or more programs further comprise instructions for:
batching a plurality of log entries into a log entry collection, the log entry collection including a last respective log entry associated with a last record; and
performing a second write operation that includes writing a log stream portion to a log stream in the persistent datastore, the log stream portion includes the log entry collection and, separate from the log entry collection, a pointer to a next record following the last record.

15. The electronic system of claim 14, wherein the plurality of log entries in the log entry collection are sequentially written to the log stream in the persistent datastore.

16. The electronic system of claim 10, wherein the one or more programs further comprise instructions for:
batching a plurality of log entries into a log entry collection, the log entry collection including a last respective log entry associated with a last record; and
performing a second write operation that includes writing a log stream portion to a log stream in the persistent datastore, the log stream portion includes the log entry collection and a plurality of pointers, wherein:
each of the plurality of pointers is associated with one of a plurality of record sets, wherein at least one record set of the plurality of record sets has a different size from at least one other record set of the plurality of record sets; and one of the plurality of pointers is associated with a next record following the last record.

17. The electronic system of claim 16, wherein each of the log entries in the log entry collection corresponds to one of the plurality of different record sizes.

18. The electronic system of claim 10, wherein the one or more programs further comprise instructions for:
generating a third record including a log entry indicating that the third record represents a deletion of the first write data, a tombstone corresponding to the deleted first write data, and a forward reference identifier associated with a fourth record; and
performing a third write operation that includes writing the third record to the persistent datastore.

19. A non-transitory computer readable storage medium storing one or more programs, the one or more programs comprising instructions, which, when executed by an electronic system with one or more processors, cause the electronic systems to perform operations comprising:
generating a first log entry associated with first write data to be stored in a persistent data store, wherein the first log entry includes information sufficient to replay a transaction associated with the first write data;
generating a forward reference identifier for a second record of a plurality of sequential records that is different from a first record of the plurality of sequential records, wherein each respective record of the plurality of sequential records includes a respective log entry, write data that was not yet stored in the persistent data store when said log entry was generated, a respective reference identifier for the respective record, a forward reference identifier for a next record in the sequence, and a pointer to a next record in the sequence;
generating the first record including the first log entry, the first write data, the forward reference identifier for the second record, and a pointer to the second record;
performing a single write operation that includes writing the first record to the persistent datastore, wherein:
the pointer to the second record is a pointer to a location in the persistent data store allocated for writing the second record prior to writing the first record and the second record to the persistent datastore, and
the forward reference identifier for the second record is different from the pointer to the second record; and
performing a recovery operation that includes:
reading the first log entry;
using the pointer to the second record to read a second log entry;
determining whether the forward reference identifier for the second record matches a second reference identifier in the second record;
in accordance with a determination that the forward reference identifier for the second record matches the second reference identifier in the second record, replaying a transaction associated with the second log entry; and
in accordance with a determination that the forward reference identifier for the second record does not match the second reference identifier in the second record, stopping the recovery operation.

* * * * *